(12) United States Patent
Nakagawa

(10) Patent No.: US 11,137,150 B2
(45) Date of Patent: Oct. 5, 2021

(54) PARTITION

(71) Applicant: DAIKIN INDUSTRIES, LTD., Osaka (JP)

(72) Inventor: Ryoichi Nakagawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/271,489

(22) PCT Filed: Aug. 9, 2019

(86) PCT No.: PCT/JP2019/031732
§ 371 (c)(1),
(2) Date: Feb. 25, 2021

(87) PCT Pub. No.: WO2020/045069
PCT Pub. Date: Mar. 5, 2020

(65) Prior Publication Data
US 2021/0247078 A1    Aug. 12, 2021

(30) Foreign Application Priority Data

Aug. 27, 2018    (JP) .............................. JP2018-158770

(51) Int. Cl.
*F24F 1/0314*    (2019.01)
*F24F 13/10*    (2006.01)
(Continued)

(52) U.S. Cl.
CPC .............. *F24F 1/0314* (2019.02); *E04B 2/74* (2013.01); *F24F 11/58* (2018.01); *F24F 11/63* (2018.01);
(Continued)

(58) Field of Classification Search
CPC ...... F24F 1/0314; F24F 1/0059; F24F 1/0063; F24F 1/0067; F24F 13/10; F28F 2265/26;
(Continued)

(56) References Cited

U.S. PATENT DOCUMENTS

| | | | |
|---|---|---|---|
| 9,599,363 B1* | 3/2017 | Smith | ...................... F24F 13/10 |
| 2003/0083721 A1* | 5/2003 | Larnard | ..................... A61F 7/12 |
| | | | 607/105 |

(Continued)

FOREIGN PATENT DOCUMENTS

| | | |
|---|---|---|
| JP | 50-78467 A | 6/1975 |
| JP | 2-169935 A | 6/1990 |

(Continued)

OTHER PUBLICATIONS

International Search Report of corresponding PCT Application No. PCT/JP2019/031732 dated Oct. 8, 2019.

(Continued)

*Primary Examiner* — Nelson J Nieves
(74) *Attorney, Agent, or Firm* — Global IP Counselors, LLP

(57) ABSTRACT

A partition includes a first structure, a deformable partitioning portion connected to the first structure, and an air-environment adjusting portion disposed at at least one of the first structure and the deformable partitioning portion. The deformable partitioning portion has a first end portion on a side connected to the first structure and a second end portion on a distal side from the first end portion. The deformable partitioning portion partitions a predetermined space with respect to an adjacent space. The air-environment adjusting portion includes at least one of a cooling portion configured to cool air, a heating portion configured to heat air, and an airflow generating portion configured to generate an airflow.

16 Claims, 24 Drawing Sheets

(51) Int. Cl.
  *E04B 2/74* (2006.01)
  *F24F 11/58* (2018.01)
  *F24F 11/63* (2018.01)
  *F24F 11/72* (2018.01)
  *F24F 120/20* (2018.01)

(52) U.S. Cl.
  CPC .............. *F24F 11/72* (2018.01); *F24F 13/10* (2013.01); *F24F 2120/20* (2018.01); *F24F 2203/1048* (2013.01); *F24F 2221/17* (2013.01)

(58) Field of Classification Search
  CPC .. F28F 3/046; F28F 2255/02; F28F 2009/228; F28D 2020/0091; F28D 2020/0095; F25B 39/00; F25B 39/02; F25B 39/022; F25B 2339/00; F25B 2339/02
  See application file for complete search history.

(56) References Cited

U.S. PATENT DOCUMENTS

2004/0206486 A1* 10/2004 Whittenberger ....... B01J 19/249
                                                    165/165
2006/0111765 A1*  5/2006 Kirkman, Jr. ........... A61F 7/123
                                                    607/104
2006/0124287 A1*  6/2006 Reinders ............... F24F 5/0035
                                                    165/166
2007/0225781 A1*  9/2007 Saadat .................... A61F 7/12
                                                    607/105
2018/0100671 A1*  4/2018 Snider .................... F24F 13/30
2019/0041135 A1*  2/2019 Thipchuwong .......... F28D 1/03

FOREIGN PATENT DOCUMENTS

| JP | 3-8910 Y2 | 3/1991 |
| JP | 2000-83782 A | 3/2000 |
| JP | 2006-177634 A | 7/2006 |
| JP | 2008-248550 A | 10/2008 |
| JP | 2010-22641 A | 2/2010 |
| JP | 2016-65406 A | 4/2016 |
| JP | 2017-106678 A | 6/2017 |

OTHER PUBLICATIONS

International Preliminary Report of corresponding PCT Application No. PCT/JP2019/031732 dated Mar. 11, 2021.

* cited by examiner derpartitition# PARTITION

CROSS-REFERENCE TO RELATED APPLICATIONS

This U.S. National stage application claims priority under 35 U.S.C. § 119(a) to Japanese Patent Application No. 2018-158770, filed in Japan on Aug. 27, 2018, the entire contents of which are hereby incorporated herein by reference.

BACKGROUND

Field of the Invention

The present disclosure relates to a partition that partitions a space.

Background Information

In recent years, an open-floor plan, in which a space is not partitioned by a partition, has been increasingly employed in offices and the like. Employing an open-floor plan is expected to provide a merit of, for example, improving creativity and cooperativeness of humans who work in the open-floor plan.

SUMMARY

Technical Problem

Meanwhile, the open-floor plan, however, cannot be said to be optimal, for example, when a human intends to concentrate on work and the like, and a measure of, for example, providing a partition such as that disclosed in, for example, Japanese Unexamined Patent Application Publication No. 2000-83782 to temporality partition and utilize a space may be taken.

Japanese Unexamined Patent Application Publication No. 2000-83782, however, has a room to be improved from the point of view of making a space partitioned by the partition be a space comfortable for a user.

A partition of a first aspect includes a first structure, a deformable partitioning portion, and an air-environment adjusting portion. The deformable partitioning portion is connected to the first structure. The deformable partitioning portion has a first end portion on a side connected to the first structure, and a second end portion on a distal side from the first end portion. The deformable partitioning portion deforms to partition a predetermined space with respect to an adjacent space. The air-environment adjusting portion is disposed at at least one of the first structure and the deformable partitioning portion. The air-environment adjusting portion includes at least one of a cooling portion that cools air, a heating portion that heats air, and an airflow generating portion that generates an airflow.

It is possible here to easily create a space that is partitioned from surroundings by the partition and that is comfortable for a user.

A partition of a second aspect is the partition of the first aspect in which the deformable partitioning portion is deformable into a first state and a second state. The deformable partitioning portion in the first state is accommodated in an inner portion of the first structure, is wound around an outer periphery of the first structure, or is folded in a vicinity of the first structure. The second state is a state in which a maximum value of an area of the deformable partitioning portion when viewed from every direction in a horizontal direction is larger than that in the first state.

It is possible here as a result of the deformable partitioning portion taking the second state during use to partition the predetermined space that is comparatively large, with respect to the adjacent space by the partition. It is possible as a result of the deformable partitioning portion taking the first state during non-use to store the partition in a small space.

A partition of a third aspect is the partition of the second aspect in which the deformable partitioning portion is configured to take a plurality of second states in different forms.

It is possible here to partition a space into a plurality of different shapes in accordance with needs, which is convenient.

A partition of a fourth aspect is the partition of the third aspect in which the deformable partitioning portion has a first surface and a second surface opposite to the first surface. The deformable partitioning portion is configured to take, as the second state, a first form of protruding on a side of the first surface and a second form of protruding on a side of the second surface.

It is possible here to partition a space into different shapes in accordance with needs, which is convenient.

A partition of a fifth aspect is the partition of the fourth aspect in which the air-environment adjusting portion includes at least the airflow generating portion. The airflow generating portion generates different airflows in accordance with which one of the first form and the second form is taken as the second state by the deformable partitioning portion.

It is possible here to accurately adjust air environment of a space partitioned by the partition since different airflows are generated in accordance with a direction in which the deformable partitioning portion protrudes.

A partition of a sixth aspect is the partition of any of the second aspect to the fourth aspect in which the air-environment adjusting portion includes at least the airflow generating portion that causes air to be blown out through a blow-out port disposed at the first structure. The blow-out port is disposed in a vicinity of the first end portion of the deformable partitioning portion.

A partition of a seventh aspect is the partition of the sixth aspect in which the blow-out port causes air to be blown out along at least a portion of a surface of the deformable partitioning portion in the second state.

It is possible here to accurately adjust air environment of a space partitioned by the partition since the deformable partitioning portion is also utilized as a guide for an airflow.

A partition of an eighth aspect is the partition of any of the second aspect to the fourth aspect in which the air-environment adjusting portion includes at least the airflow generating portion that causes air to be blown out through a blow-out port disposed at the deformable partitioning portion.

It is easy here to cause air to be blown out to reach a position away from the first structure, compared with when a blow-out port is provided at the first structure, since air is blown out from the deformable partitioning portion.

A partition of a ninth aspect is the partition of the eighth aspect in which the airflow generating portion further includes an airflow direction adjustment mechanism that adjusts an airflow direction.

It is possible here by providing the airflow direction adjustment mechanism to accurately adjust air environment of the predetermined space partitioned with respect to the adjacent space.

A partition of a tenth aspect is the partition of any of the second aspect to the ninth aspect in which the first structure has a columnar shape extending to have an axial direction in a first direction. When the first structure is installed such that the first direction is an up-down direction, the first end portion and the second end portion of the deformable partitioning portion are disposed at positions at an identical height and away from each other in a horizontal direction in the second state. When the first structure is installed such that the first direction is the horizontal direction, the first end portion and the second end portion of the deformable partitioning portion are disposed at different heights in the second state.

Flexibility of the shape of a space partitioned by the partition is high here since the installation state of the first structure can be changed.

A partition of an eleventh aspect is the partition of any of the first aspect to the tenth aspect in which the air-environment adjusting portion causes a first fluid to flow in an inner portion of the deformable partitioning portion.

A partition of a twelfth aspect is the partition of the eleventh aspect in which the first fluid is air.

A partition of a thirteenth aspect is the partition of any of the first aspect to the tenth aspect in which at least one of the cooling portion and the heating portion includes a heat storage material.

It is possible here by utilizing the heat storage material in the cooling portion or the heating portion to realize cooling and heating of air while simplifying the configuration and structure of the partition.

A partition of a fourteenth aspect is the partition of any of the first aspect to the twelfth aspect in which the air-environment adjusting portion includes at least one of the cooling portion that cools air by a heat pump provided in the first structure and the heating portion that heats air by a heat pump provided in the first structure. Waste heat generated when air is cooled by the heat pump and when air is heated by the heat pump is A) discharged into a first space in which an influence of the waste heat onto a temperature of the predetermined space is small or into a second space that is determined that no human is present therein based on a result of detection by a human detection sensor included in the partition or B) stored in a heat storage material provided in the first structure.

It is possible here, while suppressing the influence of waste heat with respect to a human, to dispose the partition at a comparatively free position, cool/heat air by utilizing the heat pump, and easily create a temperature-controlled comfortable space.

A partition of a fifteenth aspect is the partition of any of the first aspect to the fourteenth aspect further including a storage battery that supplies electric power to the air-environment adjusting portion. The partition is of a portable type.

It is possible here to create, even in a place where a power source is difficult to be ensured, a comfortable space in which air environment is adjusted by the partition, which is highly flexible in terms of space utilization.

A partition of a sixteenth aspect is the partition of any of the first aspect to the ninth aspect in which the first structure has a columnar shape extending to have an axial direction in an up-down direction. The first structure includes a leg portion that assists self-standing of the first structure.

It is possible here to suppress by the leg portion the first structure from falling, which is highly safe.

A partition of a seventeenth aspect is the partition of any of the first aspect to the sixteenth aspect further including an arousal-level grasping unit and a control unit. The arousal-level grasping unit grasps the arousal level of a human in the predetermined space. The control unit controls at least one of the air-environment adjusting portion, a releasing portion that is provided at the partition and that releases an aromatic substance, and an illumination device provided at the partition, in accordance with the arousal level of the human grasped by the arousal-level grasping unit.

It is possible here to change at least one of the air environment, the fragrance, and the illumination in the predetermined space formed by the partition, in accordance with the arousal level of the human and thus possible to improve the arousal level of the human in the predetermined space and improve work efficiency and the like.

A partition of an eighteenth aspect is the partition of any of the first aspect to the sixteenth aspect further including a communication unit and a control unit. The communication unit communicates with an external device that stores information relating to a human in the predetermined space. The control unit controls the air-environment adjusting portion based on information that relates to a human in the predetermined space and that is received from the external device via the communication unit or an instruction generated by the external device based on information relating to a human in the predetermined space and that is received via the communication unit.

It is easy here to adjust the air environment of the predetermined space into an air environment preferable to a user on the basis of information relating to a human in the predetermined space.

A partition of a nineteenth aspect is the partition of any of the first aspect to the eighteenth aspect in which the airflow generating portion includes a filter that removes dust in air.

It is possible here to improve cleanliness of air blown out from the partition.

BRIEF DESCRIPTION OF DRAWINGS

In FIG. 6, a schematic sectional view is illustrated regarding the first structure.

DETAILED DESCRIPTION OF EMBODIMENT(S)

Embodiments of a partition will be described below.

First Embodiment

A partition 1 of a first embodiment will be described with reference to FIG. 1 to FIG. 10.

Figure 1:
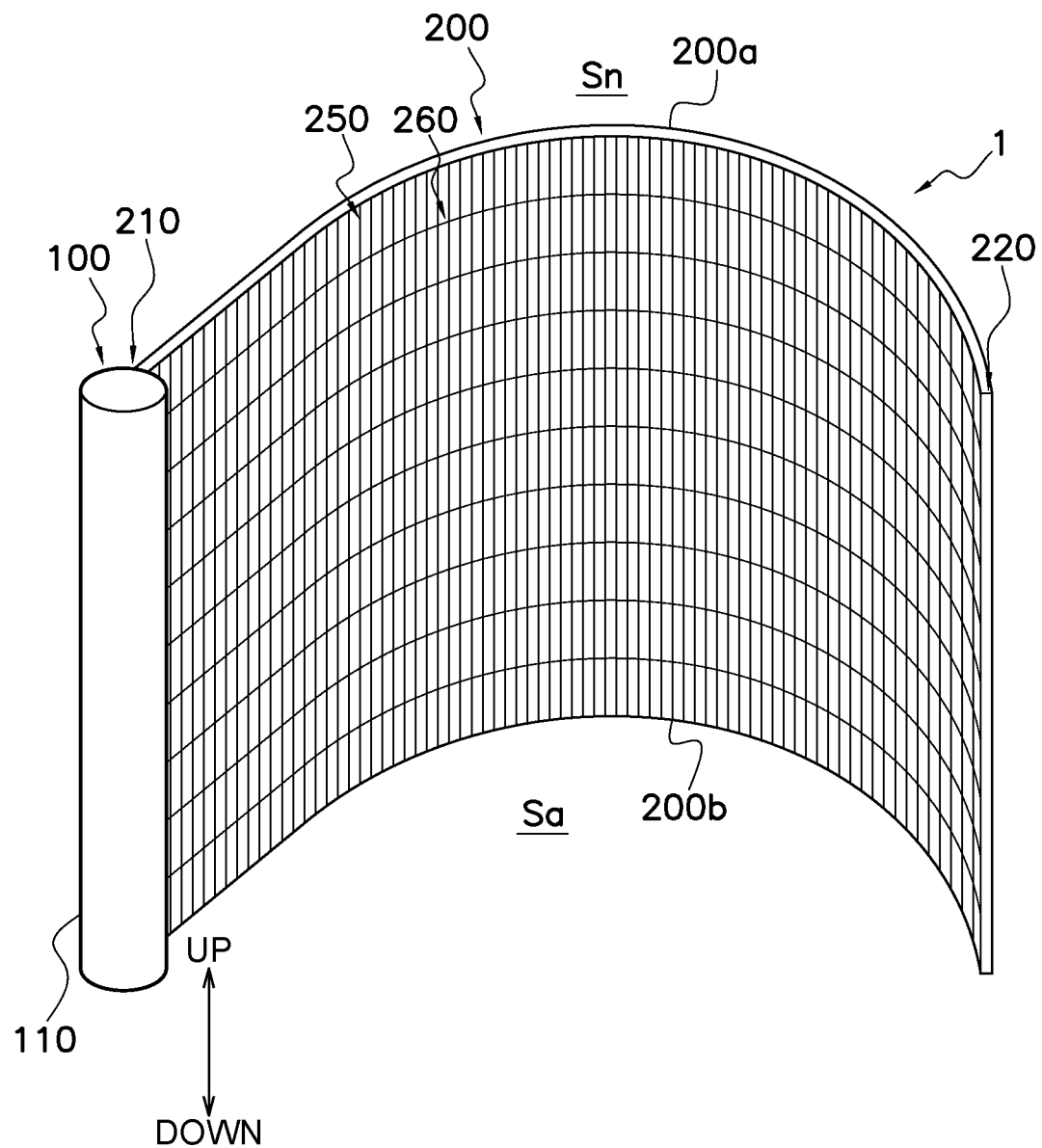
FIG. 1 is a schematic perspective view of a partition according to a first embodiment, the partition including a deformable partitioning portion in a second state.
Figure 2:
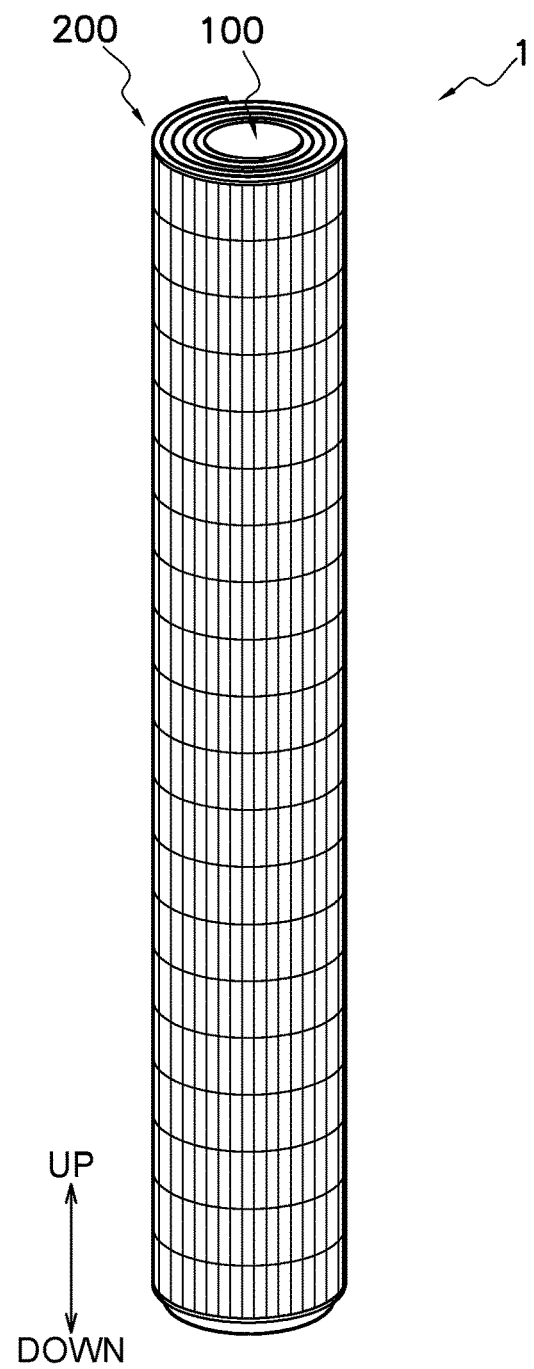
FIG. 2 is a schematic perspective view of the partition in FIG. 1 in which the deformable partitioning portion is in a first state.
Figure 3:
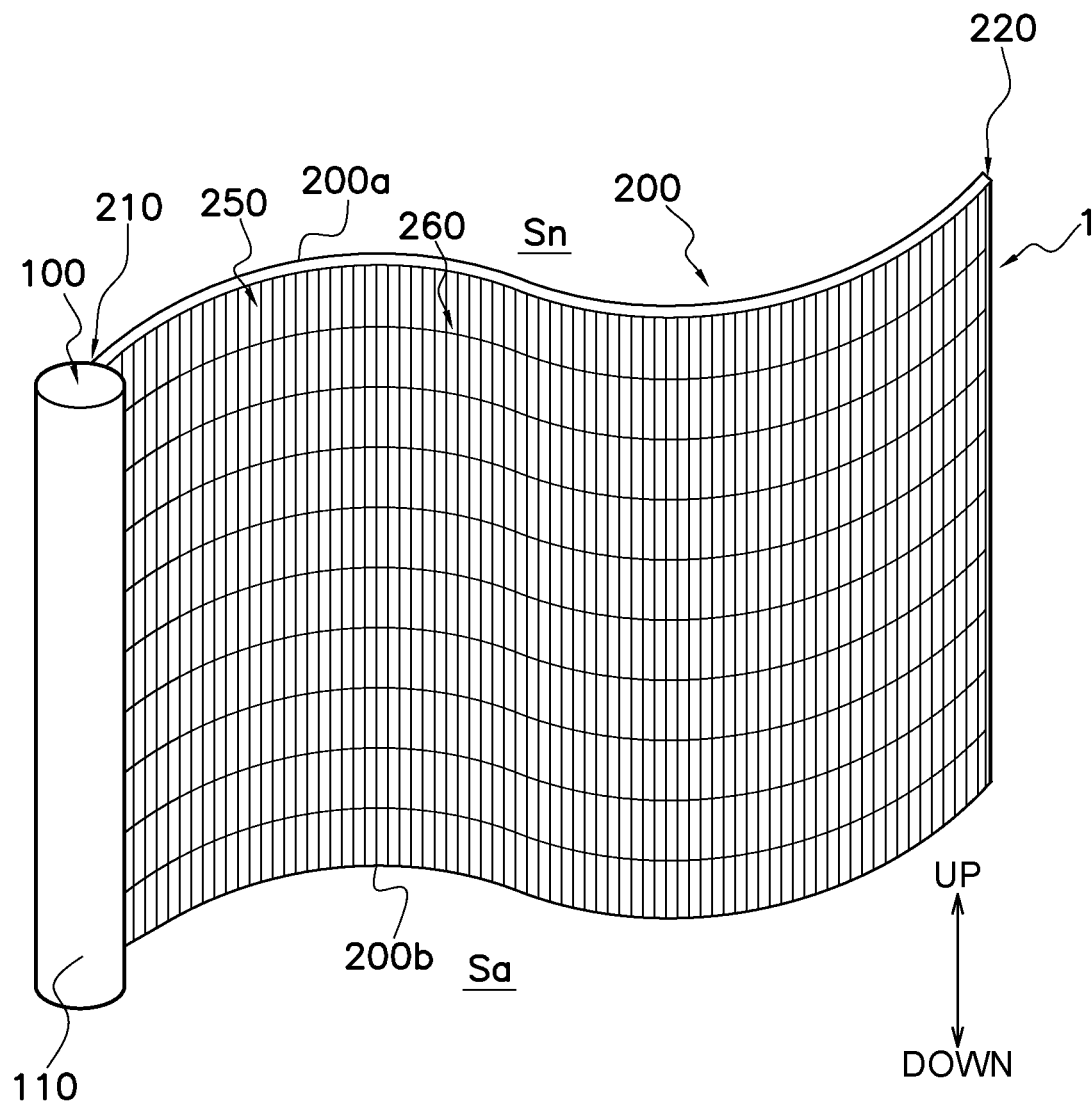
FIG. 3 is a schematic perspective view of the partition of the first embodiment in which the deformable partitioning portion is in the second state in a form that differs from that in FIG. 1.
Figure 4A:
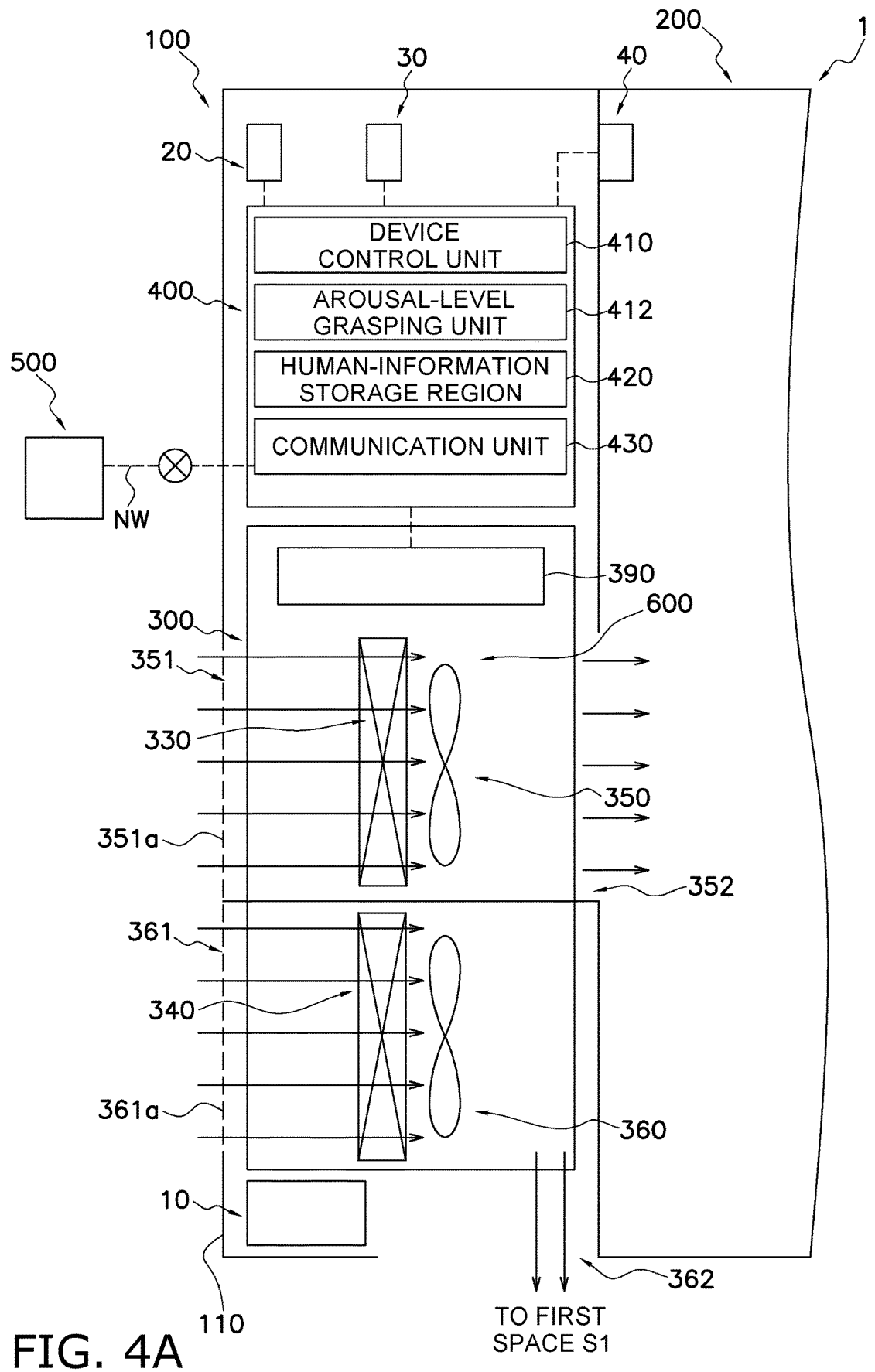
FIG. 4A is an example of a block diagram of the partition in FIG. 1.
Figure 4B:
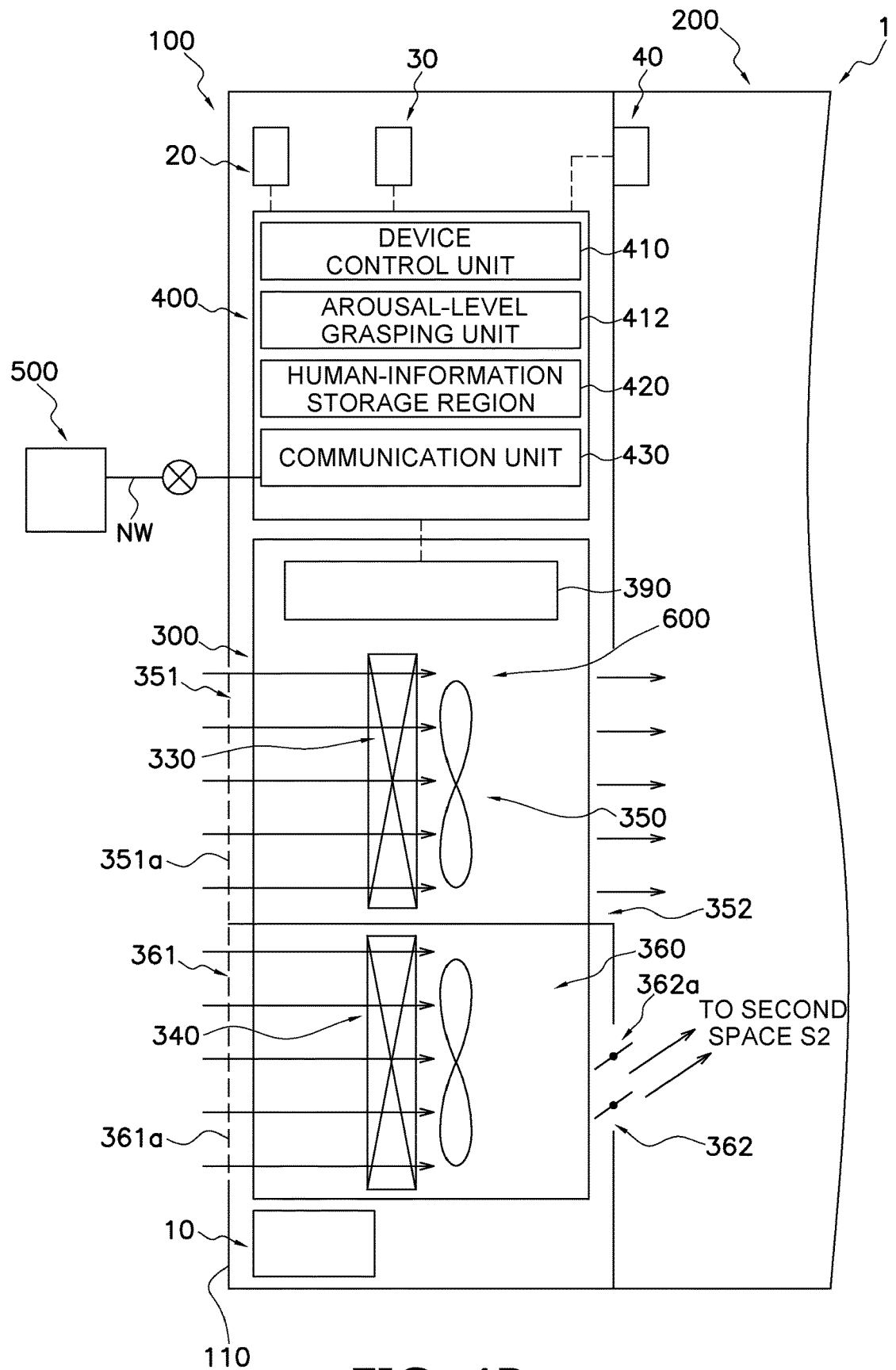
FIG. 4B is another example of the block diagram of the partition in FIG. 1.
Figure 4C:
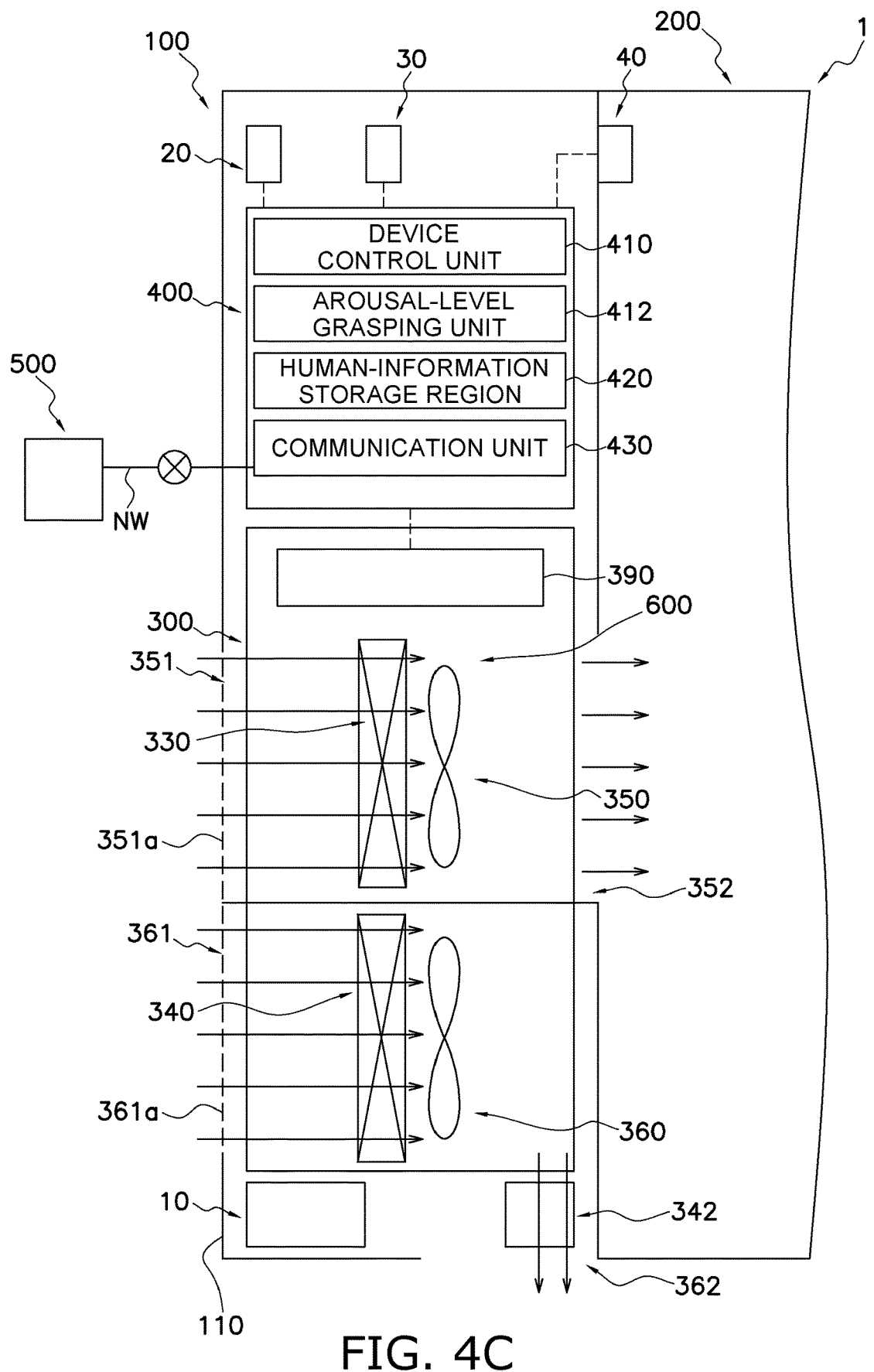
FIG. 4C is still another example of the block diagram of the partition in FIG. 1.
Figure 5:
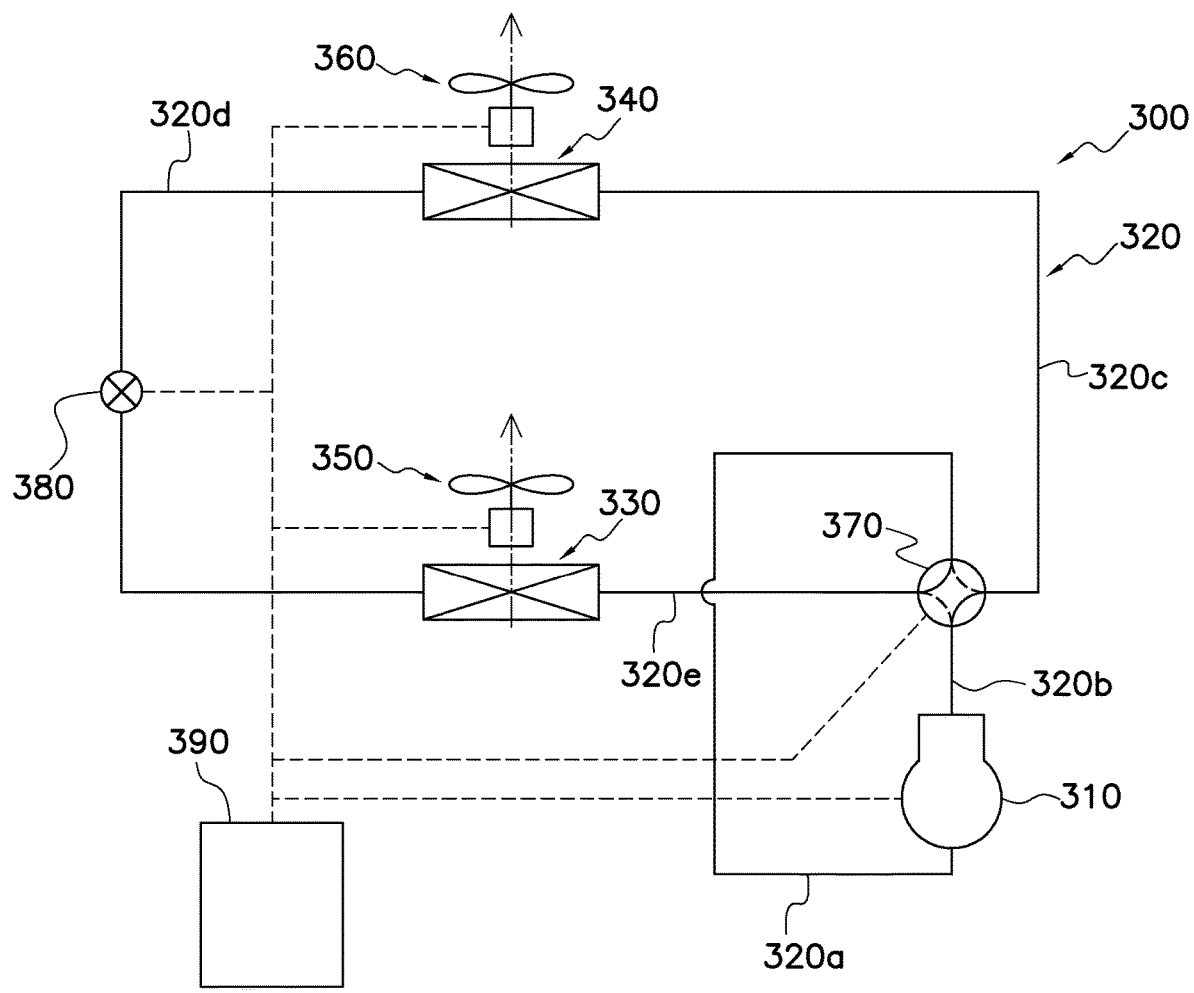
FIG. 5 is a schematic diagram of an air conditioning apparatus of the partition in FIG. 1.
Figure 6:
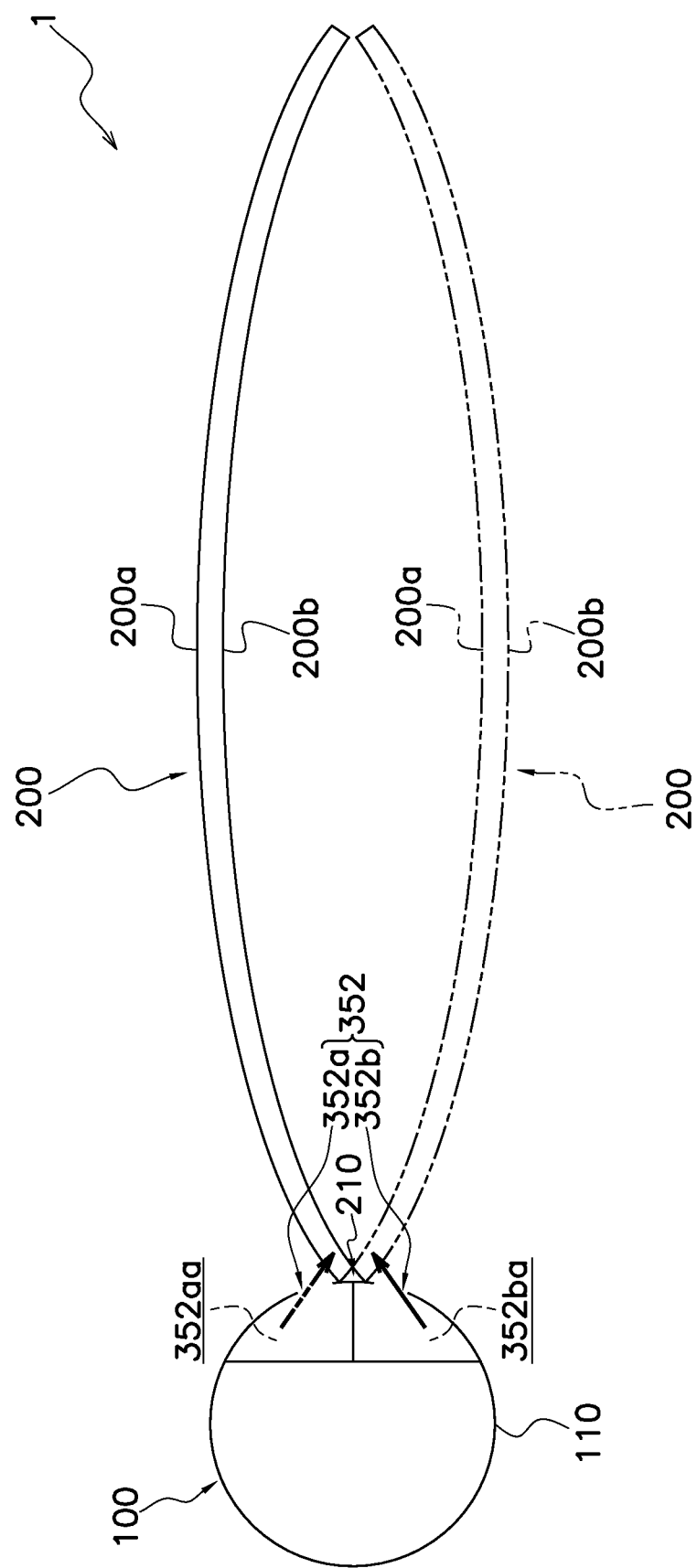
FIG. 6 is a schematic plan view of the partition in FIG. 1, in which the deformable partitioning portion in the first form is drawn with a solid line, and the deformable partitioning portion in the second form is drawn with a two-dot chain line.
Figure 7:
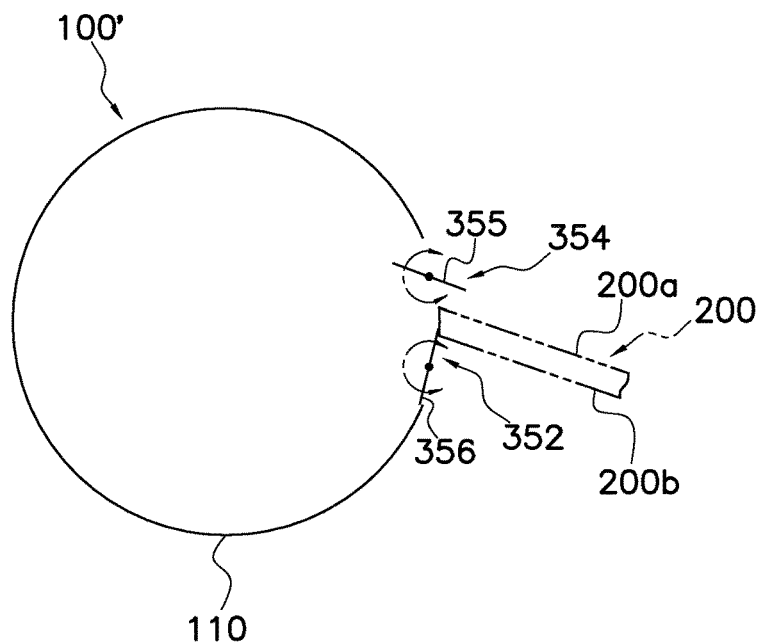
FIG. 7 is a schematic sectional view of the first structure according to another example in which the shape of a blow-out port differs from that in the first structure in FIG. 6.
Figure 8:
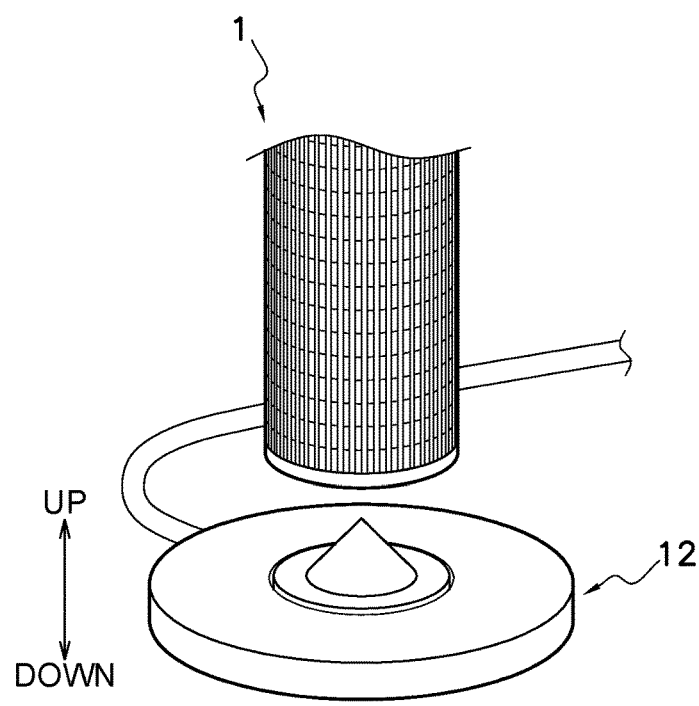
FIG. 8 is a schematic perspective view of a charger for charging a storage battery of the partition in FIG. 1.
Figure 9:
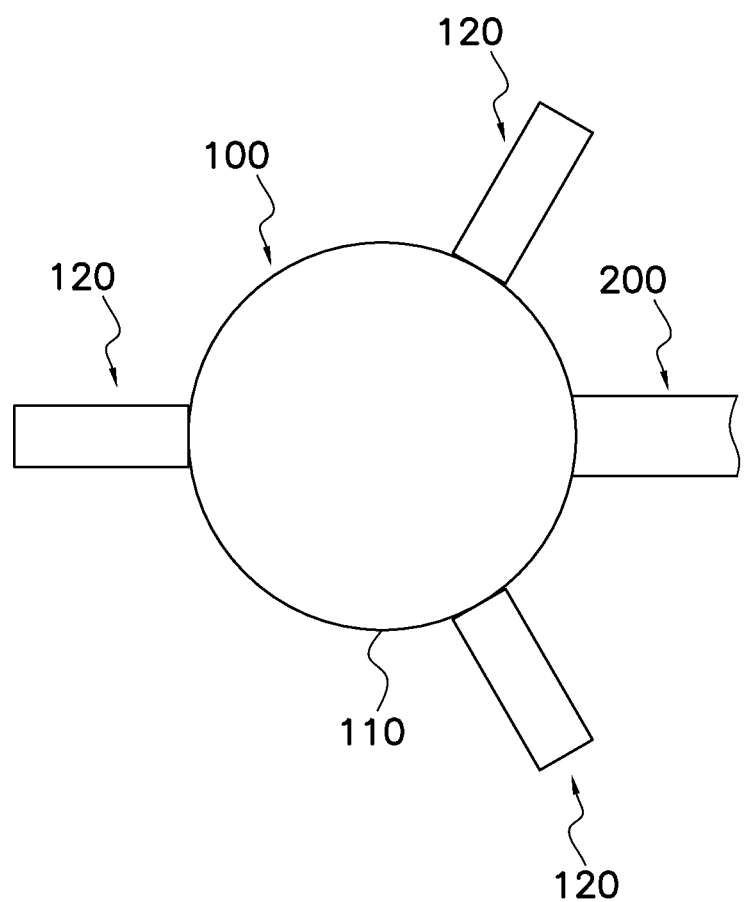
FIG. 9 is a schematic top plan view of the first structure of the partition in FIG. 1 with leg portions jutting out.
Figure 10:
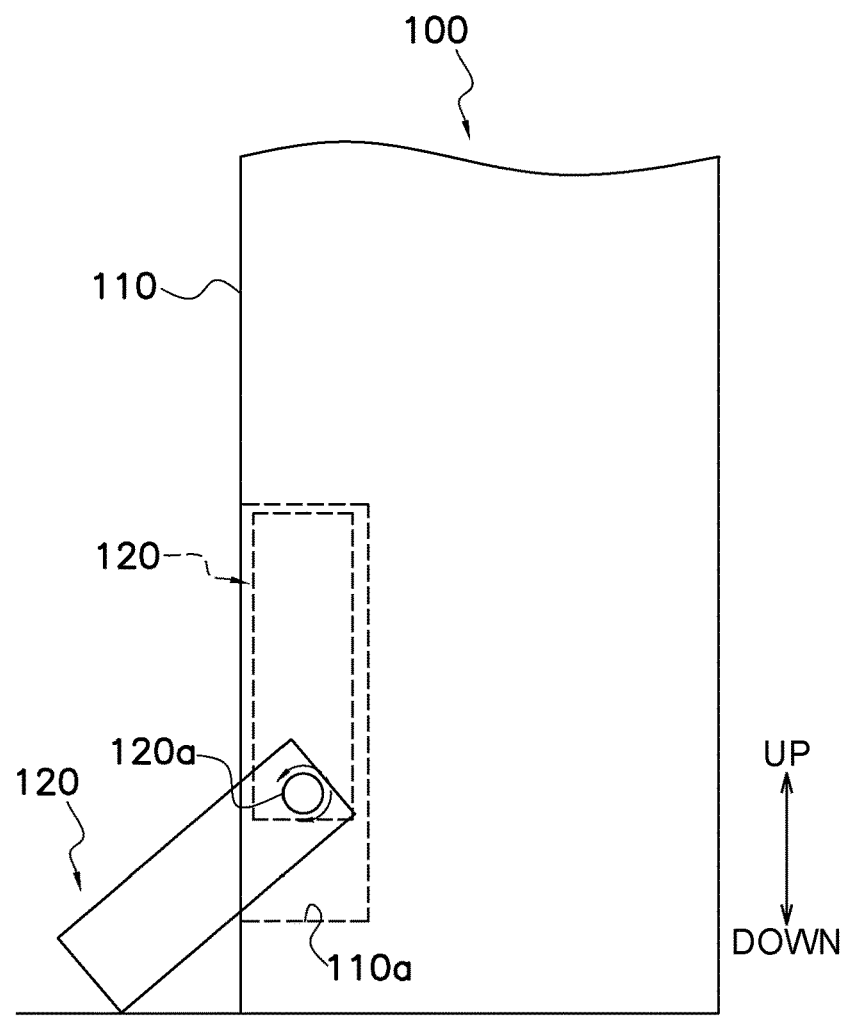
FIG. 10 is a schematic side view for describing the structure of the leg portions of the first structure in FIG. 9.

FIG. 1 to FIG. 3 are schematic perspective views in which partitions that differ from each other in terms of state and/or shape of a later-described partitioning portion 200 are drawn. FIG. 4A to FIG. 4C are examples of the block diagram of the partition 1. FIG. 5 is a schematic diagram of an air conditioning apparatus 300 included in the partition 1. FIG. 6 is a schematic plan view of the partition 1, in which two different forms of the partitioning portion 200 are drawn with a solid line and a two-dot chain line. In FIG. 6, a schematic sectional view is indicated regarding a later described first structure 100 to indicate the internal structure thereof. FIG. 7 is a schematic sectional view of a first structure 100', which differs from the first structure 100 in FIG. 6 in terms of shape of a blow-out port formed therein. FIG. 8 is a schematic perspective view of a charger 12 for charging a later-described storage battery 10 of the partition 1. FIG. 9 is a schematic top plan view of the first structure 100 of the partition 1 with later-described leg portions 120 jutting out. FIG. 10 is a schematic side view for describing the structure of the leg portions 120 of the first structure 100.

(1) Overall Configuration

The partition 1 will be roughly described.

The partition 1 is an apparatus that partitions a space Sa and an adjacent space Sn adjacent to the space Sa from each other by the partitioning portion 200 (refer to FIG. 1).

The partition 1 is preferably a portable apparatus. The partition 1 is an apparatus that is to be used in, for example, an office and the like but does not intend to limit the utilization place. For example, the partition 1 is utilized in an open office and can create the semi-private space Sa at a desired position in the open office. Due to a shielding and sound insulating function of the partitioning portion 200, a human who performs work and the like in the space Sa is less likely to receive influences of a movement of a human in the adjacent space Sn and a sound generated in the adjacent space Sn and easily concentrates on the work and the like. Conversely, when a meeting or the like is performed in the space Sa, adverse influences onto activities of a human in the adjacent space Sn can be suppressed due to the shielding and sound insulating function of the partitioning portion 200.

In particular, in the partition 1, the shape of the partitioning portion 200 is changeable as described later. Therefore, the partition 1 can produce the space Sa having a shape in accordance with conditions including limitation of an installation space, the number of humans who utilize the space Sa, the content of work to be performed in the space Sa, and the like. The shape of the partitioning portion 200 of the partition 1 is changeable in the partition 1, and it is thus possible to store the partition 1 in a comparatively small space by deforming the partitioning portion 200 into a compact shape during non-use.

The partition 1 has an air-environment adjusting function (a cooling function, a heating function, and an air-blowing function). The partition 1 thus can produce the space Sa in which comfortability is high in terms of air environment.

The partition 1 includes, mainly, the first structure 100, the partitioning portion 200, as an example of a deformable partitioning portion, and the air conditioning apparatus 300, as an example of an air-environment adjusting portion (refer to FIG. 4A to FIG. 4C). In addition, the partition 1 preferably includes the storage battery 10 (refer to FIG. 4A to FIG. 4C). In addition, the partition 1 preferably includes a controller 400. In addition, the partition 1 preferably includes a human detection sensor 20 (refer to FIG. 4A to FIG. 4C). In addition, the partition 1 preferably includes a fragrance releasing device 30 (refer to FIG. 4A to FIG. 4C). In addition, the partition 1 preferably includes an illumination device 40 (refer to FIG. 4A to FIG. 4C).

(2) Detailed Configuration

Hereinafter, the partitioning portion 200, the first structure 100, the air conditioning apparatus 300, the controller 400, the storage battery 10, the human detection sensor 20, the fragrance releasing device 30, and the illumination device 40 will be described.

In the present embodiment, the air conditioning apparatus 300, the controller 400, the storage battery 10, the human detection sensor 20, the fragrance releasing device 30, and the illumination device 40 are provided at the first structure 100. Thus, in the description of the first structure 100, the air conditioning apparatus 300, the controller 400, the storage battery 10, the human detection sensor 20, the fragrance releasing device 30, and the illumination device 40 will be described here. If structurally possible, the air conditioning apparatus 300, the controller 400, the storage battery 10, the human detection sensor 20, the fragrance releasing device 30, and the illumination device 40 may be installed at the partitioning portion 200, as an alternative to at the first structure 100. For example, the human detection sensor 20, the fragrance releasing device 30, and the illumination device 40 may be mounted to the partitioning portion 200, instead of to the first structure 100.

(2-1) Partitioning Portion

The partitioning portion 200 is a member that partitions, in a state of being deformed into a later described second state, the space Sa and the adjacent space Sn from each other (refer to FIG. 1). The space Sa faces one of a first surface 200a and a second surface 200b, which will be described later, of the partitioning portion 200, and the adjacent space Sn faces the other of the first surface 200a and the second surface 200b, which will be described later, of the partitioning portion 200.

The partitioning portion 200 is preferably an integral member but is not limited thereto. The integral member here is not limited to a member constituted by a single component. The integral member here includes a member constituted by a plurality of components, which is not dismantled into components during normal use. The "during normal use" here includes, in addition to "when the partitioning portion 200 is used in an expanded state (the second state)" as described later, "when the partitioning portion 200 is stored in a later-described accommodated state (a first state)" and "when the partitioning portion 200 is to be deformed between the accommodated state and the expanded state as described later". In other words, the integral member here includes a member that is not dismantled into components when once the partitioning portion 200 is assembled from a plurality of components, unless abnormality, such as a damage, occurs.

The partitioning portion 200 is connected at one end (a first end portion 210) thereof to the first structure 100 (refer to FIG. 1). In the present embodiment, during use of the partition 1, the first structure 100 is installed on a floor surface in a standing state (so as to extend in an up-down direction). In the following description of the partitioning portion 200, words that indicate directions such as "upper", "lower", "vertical", "horizontal", and the like are used for illustrating the directions when the first structure 100 to which the partitioning portion 200 is connected is in a standing state.

The partitioning portion 200 has the first end portion 210 on a side to be connected to the first structure 100, and a second end portion 220 on a distal side from the first end portion 210, and extends from the first end portion 210 to the second end portion 220. The length (the length when the partitioning portion 200 is stretched into a planar shape) from the first end portion 210 to the second end portion 220 is, for example, 2000 mm but is not limited thereto.

The partitioning portion 200 has a length (a height) substantially identical to that of the first structure 100 in the up-down direction. The height of the partitioning portion 200 is, for example, 1200 mm but is not limited thereto.

The partitioning portion 200 is, for example, constituted by a plurality of longitudinal frames 250 having high rigidity and extending in the up-down direction and a deformable transverse frame 260 extending in the horizontal direction and connecting the plurality of longitudinal frames 250 to each other (refer to FIG. 1 and FIG. 3). The longitudinal frames 250 are made of, for example, a metal or a resin having high rigidity. The transverse frame 260 is manufactured with, for example, a flexible material.

The partitioning portion 200 is deformable into the first state (refer to FIG. 2) of being wound around the outer periphery of the first structure 100 and the second state (refer to FIG. 1 and FIG. 3) of being expanded so as to partition the space Sa and the adjacent space Sn from each other. The maximum value of the area of the partitioning portion 200 in the second state when viewed in the horizontal direction is larger than the maximum value of the area of the partitioning portion 200 in the first state when viewed in the horizontal direction. The first state is a state taken by the partitioning portion 200 when the partition 1 is not used, and the first state is also referred to as a non-use state or a stored state. The second state is a state taken by the partitioning portion 200 when the partition 1 is used, and the second state is also referred to as a use state or an expanded state.

The partitioning portion 200 is preferably capable of taking a plurality of second states in different forms. As a result of the partitioning portion 200 being capable of taking a plurality of forms as the second state, a user of the partition 1 is enabled to partition the space Sa into various shapes in accordance with needs, which is highly convenient.

For example, in the present embodiment, the partitioning portion 200 can take the second state in a substantially C shape as in FIG. 1. In addition, in the present embodiment, the partitioning portion 200 can take the second state in a wavy shape as in FIG. 3.

In addition, in the present embodiment, the partitioning portion 200 is capable of taking, as the second state, a first form (refer to the solid line in FIG. 6) protruding on the side of the first surface 200a and a second form (refer to the two-dot chain line in FIG. 6) protruding on the side of the second surface 200b in plan view. In other words, the partitioning portion 200 is capable of taking, as the second state, the first form protruding on the side of the first surface 200a and the second form protruding on the side of the second surface 200b when the partition 1 is viewed in the axial direction of a later-described casing 110 of the first structure 100. The first surface 200a of the partitioning portion 200 is a surface (here, the surface disposed on the upper side in the plan view of FIG. 6) of one side of the partitioning portion 200 extending from the first end portion 210 toward the second end portion 220. The second surface 200b of the partitioning portion 200 is a surface (here, the surface disposed on the lower side in the plan view of FIG. 6) opposite to the first surface 200a of the partitioning portion 200.

Each of the shapes of the partitioning portion 200 indicated by the solid line and the two-dot chain line in FIG. 6 is a shape that protrude in only one direction. In contrast, the shape of the partitioning portion 200 illustrated in FIG. 3 is a shape including protrusions at a plurality of portions and includes a part protruding on the side of the first surface 200a and a part protruding on the side of the second surface 200b. Here, when the shape includes protrusions at a plurality of portions, the first form and the second form are determined on the basis of the direction of the protrusion closest to the first end portion 210 but are not limited thereto.

The form of the partitioning portion 200 in the second state drawn in, for example, FIG. 1, FIG. 3, and FIG. 6 is merely presented as an example, and the form that can be taken by the partitioning portion 200 in the second state is not limited to the illustrated form.

For example, as illustrated in FIG. 1, the longitudinal frames 250 may be exposed as there are at the first surface 200a and the second surface 200b of the partitioning portion 200. In another form, the longitudinal frames 250 may be covered at the first surface 200a and the second surface 200b by a fabric, such as a woven fabric, a knitted fabric, and a cloth.

(2-2) First Structure

The first structure 100 includes the columnar casing 110 extending to have an axial direction in a first direction (refer to FIG. 1). In the present embodiment, the casing 110 has a circular column shape. The shape of the casing 110 is, however, not limited to a circular column shape and may be other shapes, such as an elliptic circular column shape and a polygonal column shape. In the present embodiment, when the partition 1 is used, the first structure 100 is placed such that the first direction, that is the axial direction of the casing 110, is the up-down direction.

The casing 110 accommodates therein various instruments and various members. The casing 110 also supports various instruments and various members that are mounted to the outer surface of the casing 110. For example, in the present embodiment, the air conditioning apparatus 300, the controller 400, the human detection sensor 20, and the fragrance releasing device 30 are at least partially accommodated in the inner portion of the casing 110. The illumination device 40 is mounted to the outer surface of the casing 110.

The partitioning portion 200 is connected to the casing 110 of the first structure 100. The first structure 100 assists self-standing of the partitioning portion 200 to suppress the partitioning portion 200 from falling. The casing 110 of the first structure 100 has a function as a core part around which the partitioning portion 200 is to be wound when the partition 1 is stored.

The casing 110 of the first structure 100 preferably includes the leg portions 120 for assisting self-standing of the casing 110. As illustrated in FIG. 9, the casing 110 includes, for example, three leg portions 120. The number of the leg portions 120 is, however, not limited to three and can be determined, as appropriate, so that the leg portions 120 have a function of falling suppression. The leg portions 120 are members for the purpose of, mainly, suppression of falling. It is preferable that the partition 1 including the first structure 100 be able to stand by itself without the leg portions 120.

In one embodiment, the leg portions 120 are supported by a shaft 120a to be able to swing and are configured to be rotatable around the shaft 120a. When the partition 1 is not used (when the partitioning portion 200 is in the first state as in FIG. 2), the leg portions 120 are accommodated as illustrated by a broken line in FIG. 10 in a concave portion 110a formed at a lower portion of the outer surface of the casing 110. When the partition 1 is used with the partitioning portion 200 expanded as in FIG. 1 and FIG. 3, the leg portions 120 are rotated around the shaft 120a so as to jut out to the outside of the concave portion 110a, and the tips of the leg portions 120 are in contact with a floor surface as illustrated by a solid line in FIG. 10 (in FIG. 1 and FIG. 3, the leg portions 120 are not drawn). The leg portions 120 whose tips are in contact with the floor surface support the casing 110 to suppress falling of the casing 110.

The leg portions 120 may be rotated around the shaft 120a manually. Alternatively, the leg portions 120 may be rotated around the shaft 120a by an opening-closing mechanism utilizing a spring and the like or by a motor that is operated by a switch (not illustrated) provided at the partition 1.

The partition 1 may be configured not to allow the air conditioning apparatus 300 and the like to be usable until the leg portions 120 jet out from the concave portion 110a (for example, until a sensor (not illustrated) detects that the leg portions 120 jut out from the concave portion 110a). Such a configuration suppresses particularly easily a falling accident of the partition 1 from occurring.

(2-2-1) Air Conditioning Apparatus

The air conditioning apparatus 300 included in the partition 1 will be described. The air conditioning apparatus 300 is provided in the casing 110 of the first structure 100. The air conditioning apparatus 300 is an example of the air-environment adjusting portion. The air conditioning apparatus 300 is a heat-pump air conditioning apparatus.

In the present embodiment, the air conditioning apparatus 300 is an apparatus capable of performing cooling and heating. In other words, the air conditioning apparatus 300 is an apparatus capable of cooling or heating air with a utilization-side heat exchanger 330, as described later.

The air conditioning apparatus 300 is also an apparatus capable of blowing air by utilizing a utilization-side fan 350. Specifically, the air conditioning apparatus 300 is an apparatus that generates an airflow by using the utilization-side fan 350 to thereby cause air that has been taken into the casing 110 through a suction port 351 formed at the casing 110 to pass through the utilization-side heat exchanger 330 and be blown out through a blow-out port 352 formed at the casing 110 (refer to FIG. 4A to FIG. 4C). The air that passes through the utilization-side heat exchanger 330 is cooled or heated in the utilization-side heat exchanger 330 when a heat pump is operated and is not cooled or heated when the heat pump is not operated (when only the utilization-side fan 350 is operated).

The air conditioning apparatus 300 is not limited to an apparatus capable of performing cooling and heating. The air conditioning apparatus 300 may be, for example, a machine exclusive for cooling and capable of performing cooling only. Alternatively, the air conditioning apparatus 300 may be, for example, a machine exclusive for heating and capable of performing heating only. When the air conditioning apparatus 300 is a machine exclusive for cooling or a machine exclusive for heating, the air conditioning apparatus 300 may not include a later-described flow-path switching mechanism 370.

As illustrated in FIG. 5, the air conditioning apparatus 300 includes a refrigerant circuit 320 in which devices, such as a compressor 310, the flow-path switching mechanism 370, the utilization-side heat exchanger 330, an expansion mechanism 380, and a heat-source-side heat exchanger 340, are connected by pipes. In addition, the air conditioning apparatus 300 includes the utilization-side fan 350 that generates an airflow to cause air to pass through the utilization-side heat exchanger 330, and a heat-source-side fan 360 that generates an airflow to cause air to pass through the heat-source-side heat exchanger 340 (refer to FIG. 5). Operation of the air conditioning apparatus 300 is controlled by a control unit 390 (refer to FIG. 5).

(2-2-1-1) Compressor

The compressor 310 is an apparatus that sucks a refrigerant having a low pressure of a refrigeration cycle, compresses the refrigerant and then discharges the refrigerant. The compressor 310 is, for example, an inverter-controlled compressor whose capacity is adjustable (the number of revolutions of a motor is adjustable). The compressor 310 is, however, not limited thereto and may be a compressor whose capacity is constant.

(2-2-1-2) Flow-path Switching Mechanism

The flow-path switching mechanism 370 is a mechanism that switches a flowing direction of the refrigerant in the refrigerant circuit 320 in accordance with an operating mode (cooling operating mode/heating operating mode). In the present embodiment, the flow-path switching mechanism 370 is a four-way switching valve. The flow-path switching mechanism 370 is, however, not limited to a four-way switching valve and may be configured to be able to realize following switching of the flow path of the refrigerant by a combination of a plurality of electromagnetic valves and pipes.

In the cooling operating mode, the flow-path switching mechanism 370 switches the flow path of the refrigerant in the refrigerant circuit 320 to cause the refrigerant discharged by the compressor 310 to be sent to the heat-source-side heat exchanger 340 (refer to the solid lines in the flow-path switching mechanism 370 in FIG. 5). Specifically, in the cooling operating mode, the flow-path switching mechanism 370 causes a suction pipe 320$a$ and a second gas refrigerant pipe 320$e$ to be in communication with each other. The suction pipe 320$a$ is a pipe that connects the suction side of the compressor 310 and the flow-path switching mechanism 370 to each other. The second gas refrigerant pipe 320$e$ is a pipe that connects the gas side of the utilization-side heat exchanger 330 and the flow-path switching mechanism 370 to each other. In addition, in the cooling operating mode, the flow-path switching mechanism 370 causes a discharge pipe 320$b$ and a first gas refrigerant pipe 320$c$ to be in communication with each other. The discharge pipe 320$b$ is a pipe that connects the discharge side of the compressor 310 and the flow-path switching mechanism 370 to each other. The first gas refrigerant pipe 320$c$ is a pipe that connects the gas side of the heat-source-side heat exchanger 340 and the flow-path switching mechanism 370 to each other.

In the heating operating mode, the flow-path switching mechanism 370 switches the flowing direction of the refrigerant in the refrigerant circuit 320 to cause the refrigerant discharged by the compressor 310 to be sent to the utilization-side heat exchanger 330 (refer to the broken lines in the flow-path switching mechanism 370 in FIG. 5). Specifically, in the heating operating mode, the flow-path switching mechanism 370 causes the suction pipe 320$a$ to be in communication with the first gas refrigerant pipe 320$c$ and causes the discharge pipe 320$b$ to be in communication with the second gas refrigerant pipe 320$e$ (refer to the broken lines in FIG. 5).

(2-2-1-3) Heat-Source-Side Heat Exchanger

The heat-source-side heat exchanger 340 is a heat exchanger that causes air and the refrigerant flowing in the heat-source-side heat exchanger 340 to exchange heat therebetween. The heat-source-side heat exchanger 340 functions as a radiator (condenser) during cooling operation and functions as an evaporator during heating operation.

The heat-source-side heat exchanger 340 is a cross-fin type fin-and-tube heat exchanger constituted by heat transfer tubes (not illustrated) and a large number of fins (not illustrated) but is not limited thereto.

(2-2-1-4) Heat-Source-Side Fan

The heat-source-side fan 360 is an apparatus that generates an air flow that flows into the casing 110 through an air-intake port 361 formed at the casing 110 in which the air conditioning apparatus 300 is accommodated, passes through the heat-source-side heat exchanger 340, and flows to the outside of the casing 110 through an air-discharge port 362 formed at the casing 110.

In the present embodiment, the heat-source-side fan 360 is a propeller fan. The heat-source-side fan 360, however, may be a fan of another type.

In the present embodiment, the heat-source-side fan 360 is disposed on the downstream side from the heat-source-side heat exchanger 340 in the direction of the air flow generated by the heat-source-side fan 360. The heat-source-side fan 360 is, however, not limited thereto and may be disposed on the upstream side from the heat-source-side heat exchanger 340.

The air-intake port 361 is formed, for example, at the side surface of the casing 110. The air-intake port 361 is preferably provided with a filter 361$a$ for removing dust in air. The filter 361$a$ may be provided on the downstream side of the air-intake port 361 and on the upstream side of the heat-source-side fan 360 and the heat-source-side heat exchanger 340 in the direction of the air flow generated by the heat-source-side fan 360.

The air-discharge port 362 is formed, for example, at a bottom surface of the casing 110 so that air can be discharged into an under-floor space of a room in which the partition 1 is installed (refer to FIG. 4A). In other words, the partition 1 can discharge, into an under-floor space, waste heat (warm waste heat) generated in the heat-source-side heat exchanger 340 when air is cooled in the utilization-side heat exchanger 330 by the heat pump of the air conditioning apparatus 300 and waste heat (cold waste heat) generated in the heat-source-side heat exchanger 340 when air is heated in the utilization-side heat exchanger 330 by the heat pump of the air conditioning apparatus 300. The under-floor space is an example of a first space S1, in which an influence of waste heat onto the temperature of the space Sa partitioned by the partition 1 is small. However, the position of the air-discharge port 362 of the casing 110 is not limited to the bottom surface of the casing 110, and the first space S1 is not limited to an under-floor space. The waste heat generated in the heat-source-side heat exchanger 340 may be discharged into, for example, an attic or a ventilation duct of a room in which the partition 1 according to one example of the first space S1 is placed, through the air-discharge port 362 formed at the upper surface or the side surface of the casing 110 via an air-discharge pipe (not illustrated).

The form of discharge of the waste heat generated in the heat-source-side heat exchanger 340 is not limited to the aforementioned form. For example, the air-discharge port 362 may be provided at the upper surface or the side surface of the casing 110, and the air-discharge port 362 may be provided with an airflow direction adjustment mechanism 362$a$ whose direction is changeable by a motor or the like (refer to FIG. 4B). The airflow direction adjustment mechanism 362$a$ is, for example, a flap provided at the air-discharge port 362. The later-described control unit 390 may control the airflow direction adjustment mechanism 362$a$ on the basis of a result of detection by the later-described human detection sensor 20 to cause the air that has passed through the heat-source-side heat exchanger 340 is discharged (heat is discharged) into a space (second space S2) that is determined that no human is present therein. When the ceiling of a room in which the partition 1 is placed is comparatively high, the control unit 390 may determine a space (a space above the partition 1) on the side of the ceiling as the second space S2 without using a result of detection by the human detection sensor 20 and control the airflow direction adjustment mechanism 362$a$ to cause air to be discharged into the space on the side of the ceiling.

In addition, the partition 1 may include, as an alternative to the air-discharge port 362 and the airflow direction adjustment mechanism 362a, a nozzle (not illustrated) through which the air that has passed through the heat-source-side heat exchanger 340 is discharged and whose an air-discharging direction is changeable. The later-described control unit 390 may control the air-discharging direction of the nozzle on the basis of a result of detection by the later-described human detection sensor 20 to cause air to be discharged (heat discharge) into a space that is determined that no human is present therein.

The form of processing the waste heat generated in the heat-source-side heat exchanger 340 is not limited to the aforementioned form. For example, a heat storage material 342 may be provided in the casing 110 of the first structure 100 (refer to FIG. 4C). It may be configured such that the air that has passed through the heat-source-side heat exchanger 340 is blown out through the air-discharge port 362 formed at the casing 110, after the heat of the air (warm waste heat, cold waste heat) is removed by the heat storage material 342. The heat stored in the heat storage material 342 can be processed after utilization of the partition 1. For example, when the heat storage material 342 stores warm waste heat, the heat storage material 342 can be subjected to cooling processing after utilization of the partition 1 to remove warm waste heat from the heat storage material 342.

(2-2-1-5) Expansion Mechanism

The expansion mechanism 380 is disposed at a liquid refrigerant pipe 320d that connects the liquid side of the heat-source-side heat exchanger 340 and the liquid side of the utilization-side heat exchanger 330 to each other (refer to FIG. 5). The expansion mechanism 380 is a mechanism that expands a refrigerant flowing from the heat-source-side heat exchanger 340 toward the utilization-side heat exchanger 330 or flowing from the utilization-side heat exchanger 330 toward the heat-source-side heat exchanger 340. In the present embodiment, the expansion mechanism 380 is an electronic expansion valve whose opening degree is adjustable. The expansion mechanism 380 is, however, not limited thereto and may be, for example, a capillary tube or the like.

(2-2-1-6) Utilization-Side Heat Exchanger

The utilization-side heat exchanger 330 is a heat exchanger that causes air and the refrigerant that flows in the utilization-side heat exchanger 330 to exchange heat therebetween. The utilization-side heat exchanger 330 functions as an evaporator during cooling operation and cools air, and functions as a radiator (condenser) for the refrigerant during heating operation and heats the air. In other words, the utilization-side heat exchanger 330 functions as a cooling portion that cools air during cooling operation. The utilization-side heat exchanger 330 functions as a heating portion that heats air during heating operation.

The utilization-side heat exchanger 330 is a cross-fin type fin-and-tube heat exchanger constituted by heat transfer tubes (not illustrated) and a large number of fins (not illustrated) but is not limited thereto.

(2-2-1-7) Utilization-Side Fan

The utilization-side fan 350 constitutes a portion of an airflow generator 600 that generates an airflow. In the present embodiment, the airflow generator 600 causes air to be blown out through the blow-out port 352 disposed at the casing 110 of the first structure 100.

The utilization-side fan 350 is an apparatus that generates an air flow that flows into the casing 110 through the suction port 351 formed at the casing 110 in which the air conditioning apparatus 300 is accommodated, passes through the utilization-side heat exchanger 330, and flows to the outside of the casing 110 through the blow-out port 352 formed at the casing 110.

In the present embodiment, the utilization-side fan 350 is a propeller fan. The utilization-side fan 350, however, may be a fan of another type.

In the present embodiment, the utilization-side fan 350 is disposed on the downstream side from the utilization-side heat exchanger 330 in the direction of the air flow generated by the utilization-side fan 350. The utilization-side fan 350 is, however, not limited thereto and may be disposed on the upstream side from the utilization-side heat exchanger 330.

The suction port 351 is formed, for example, at the side surface of the casing 110; however, the place thereof is not limited. The airflow generator 600 preferably includes a filter 351a provided at the suction port 351 and removes dust in air. Provision of the filter 351a can improve cleanliness of the air blown out from the partition 1.

The blow-out port 352 is formed, for example, at the side surface of the casing 110; however, the place thereof is not limited. The blow-out port 352 is preferably disposed in the vicinity of the first end portion 210 of the partitioning portion 200 connected to the first structure 100. The airflow generator 600 preferably generates different airflows in accordance with which one of the first form (form that protrudes on the side of the first surface 200a) and the second form (form that protrudes on the side of the second surface 200b) described above is taken by the partitioning portion 200 as the second state. The wording "generates different airflows" includes a case in which, when a plurality of the blow-out ports 352 are present, air is blown out by utilizing different blow-out ports.

For example, in the present embodiment, the blow-out port 352 formed at the first structure 100 includes, as illustrated in FIG. 6, a first blow-out port 352a disposed on the side of the first surface 200a of the partitioning portion 200, and a second blow-out port 352b disposed on the side of the second surface 200b of the partitioning portion 200. Here, the first blow-out port 352a and the second blow-out port 352b are formed in the vicinity of the first end portion 210 of the partitioning portion 200. The first blow-out port 352a is in communication with a first passage 352aa formed in the casing 110, and the second blow-out port 352b is in communication with a second passage 352ba formed in the casing 110. The first passage 352aa is an air passage that guides the air that has passed through the heat-source-side heat exchanger 340 to the first blow-out port 352a by the airflow generated by the utilization-side fan 350. The second passage 352ba is an air passage that guides the air that has passed through the heat-source-side heat exchanger 340 to the second blow-out port 352b by the airflow generated by the utilization-side fan 350. The first passage 352aa and the second passage 352ba are passages partitioned from each other. The passage in which the air that has passed through the heat-source-side heat exchanger 340 flows is configured to be switchable between the first passage 352aa and the second passage 352ba by a flow-path switching damper (not illustrated) included in the airflow generator 600. When the partitioning portion 200 takes the first form, the airflow generator 600 blows out air (refer to the arrow of the solid-line in FIG. 6) through the second blow-out port 352b along the second surface 200b of the partitioning portion 200 in the first form (along the second surface 200b in the vicinity of the first end portion 210 of the partitioning portion 200) by switching the flow-path switching damper. When the partitioning portion 200 takes the second form, the airflow generator 600 blows out air (refer to the arrow of the two-dot chain line in FIG. 6) through the first blow-out port 352a along the first surface 200a of the partitioning portion 200 in the second form (along the first surface 200a in the vicinity of the first end portion 210 of the partitioning portion 200) by switching the flow-path switching damper. The flow-path switching damper may be switched by a mechanical mechanism (not illustrated) that is driven in response to a change in the orientation of the partitioning portion 200 with respect to the first structure 100. A change in the orientation of the partitioning portion 200 with respect to the first structure 100 may be detected by an angle sensor (not illustrated) or the like, and, in accordance with a result of the detection, the flow-path switching damper may be switched by being driven by a motor (not illustrated).

In another example, the blow-out port 352 may be a single blow-out port formed, as illustrated in FIG. 7, so as to extend across the partitioning portion 200 connected to the first structure 100'. The blow-out port 352 is provided with the airflow direction adjustment mechanism 354 included in the airflow generator 600. The airflow direction adjustment mechanism 354 is, for example, a flap. The airflow direction adjustment mechanism 354 adjusts the airflow direction in the horizontal direction. The airflow direction adjustment mechanism 354 includes, for example, at least two flaps 355 and 356 (refer to FIG. 7). The flap 355 is disposed on the side of the first surface 200a of the partitioning portion 200 (refer to FIG. 7). The flap 356 is disposed on the side of the second surface 200b of the partitioning portion 200 (refer to FIG. 7). When the partitioning portion 200 takes the first form, the airflow generator 600 rotates the flap 355 to close the blow-out port 352 and rotates the flap 356 to be substantially parallel to the second surface 200b in the vicinity of the first end portion 210 of the partitioning portion 200 (illustration is omitted). As a result, when the partitioning portion 200 takes the first form, the airflow generator 600 blows out air through the blow-out port 352 along the second surface 200b of the partitioning portion 200 in the first form. As illustrated in FIG. 7, when the partitioning portion 200 takes the second form, the airflow generator 600 rotates the flap 356 to close the blow-out port 352 and rotates the flap 355 to be substantially parallel to the first surface 200a in the vicinity of the first end portion 210 of the partitioning portion 200. As a result, when the partitioning portion 200 takes the second form, the airflow generator 600 blows air through the blow-out port 352 along the first surface 200a of the partitioning portion 200 in the second form. The orientation of each of the flaps 355 and 356 may be switched by a mechanical mechanism (not illustrated) that is driven in response to a change in the orientation of the partitioning portion 200 with respect to the first structure 100'. The orientation of the partitioning portion 200 with respect to the first structure 100' may be detected by an angle sensor (not illustrated) or the like, and, in accordance with a result of the detection, the orientation of each of the flaps 355 and 356 may be switched by driving by a motor (not illustrated).

The partition 1 may include, as an alternative to the blow-out port 352 and the airflow direction adjustment mechanism 354, a nozzle (not illustrated, a nozzle including an airflow direction adjustment mechanism) through which the air that has passed through the utilization-side heat exchanger 330 is blown out and whose blow-out direction is changeable. The airflow generator 600 may change the direction of the nozzle (in accordance with which one of the first form and the second form is taken by the partitioning portion 200) by a mechanical mechanism (not illustrated) that is driven in response to a change in the orientation of the partitioning portion 200 with respect to the first structure 100' or by a motor that is driven in accordance with the orientation of the partitioning portion 200 with respect to the first structure 100'.

Changing between the first blow-out port 352a and the second blow-out port 352b through which air is blown out and changing of the orientation of the airflow direction adjustment mechanism 354 and the nozzle may not be automatically adjusted. For example, a user of the partition 1 may activate a motor for driving the flow-path switching damper, the airflow direction adjustment mechanism 354, and the like by operating an operation portion (not illustrated) provided at the partition 1. Alternatively, the user of the partition 1 may manually move the flow-path switching damper, the airflow direction adjustment mechanism 354, and the like to perform changing between the blow-out ports 352a and 352b through which air is blown out, changing the direction in which air is blown out through the blow-out port 352, and the like.

When the blow-out port 352 is provided with a motor-driven airflow direction adjustment mechanism 354 or a nozzle whose blow-out direction in which the air that has passed through the utilization-side heat exchanger 330 is blown out is changeable by a motor, the control unit 390 may control the airflow direction adjustment mechanism 354 or the nozzle as below.

The control unit 390 may control the orientation of each of the airflow direction adjustment mechanism 354 and the nozzle on the basis of, for example, the position of a human in the space Sa detected by the later-described human detection sensor 20 such that air is blown out toward the human. Alternatively, the control unit 390 may, contrary, control the orientation of each of the airflow direction adjustment mechanism 354 and the nozzle on the basis of the position of a human in the space Sa detected by the later-described human detection sensor 20 such the air does not blow to the human.

(2-2-1-8) Control Unit

The control unit 390 is electrically connected to the compressor 310, the flow-path switching mechanism 370, the expansion mechanism 380, the heat-source-side fan 360, the utilization-side fan 350, and the like of the air conditioning apparatus 300 and controls operation of these devices. In a case when controlling the operation of the airflow direction adjustment mechanisms 362a and 354 on the basis of a result of the detection by the human detection sensor 20 and controlling the operation of the airflow direction adjustment mechanism 354, the flow-path switching damper, and the like on the basis of a change in the orientation of the partitioning portion 200 with respect to the first structure 100 detected by the angle sensor (not illustrated), as described above, the control unit 390 is also electrically connected to the human detection sensor 20, the angle sensor, the airflow direction adjustment mechanisms 362a and 354, the flow-path switching damper, and the like. In this case, the control unit 390 controls the operation of the airflow direction adjustment mechanisms 362a and 354, the flow-path switching damper, and the like.

The control unit 390 is provided with a MCU including, for example, a control calculation device, a storage device, an input device, an output device, and the like. For the control calculation device, a processor, such as a CPU, is usable. The control calculation device reads a program stored in the storage device and performs a predetermined calculation process in accordance with the program. In addition, the control calculation device can write a calculation result in the storage device and read information stored in the storage device in accordance with a program. The control unit 390 may be realized by a software, may be realized by a hardware, or may be realized by a hardware and a software.

In the air conditioning apparatus 300, the control unit 390 controls the operation of the compressor 310, the flow-path switching mechanism 370, the expansion mechanism 380, the heat-source-side fan 360, the utilization-side fan 350, and the like on the basis of an operation with respect to the operation portion (not illustrated) provided at the partition 1, a measured value obtained by various type of sensors (a temperature sensor, and the like) provided at the partition 1, set temperatures of cooling or heating, and the like, thereby causing the air conditioning apparatus 300 to execute cooling operation, heating operation, and air-blowing operation. Description of control of the operation of the airflow direction adjustment mechanisms 362a and 354, the flow-path switching damper, and the like, by the control unit 390, which is described above, is omitted here.

During cooling operation, the control unit 390 operates the compressor 310 and controls the flow-path switching mechanism 370 to cause the refrigerant to circulate in the refrigerant circuit 320 in the order of the compressor 310, the heat-source-side heat exchanger 340, the expansion mechanism 380, the utilization-side heat exchanger 330, and the compressor 310. The control unit 390 also controls, as appropriate, the number of revolutions of the compressor 310 and the opening degree of the expansion mechanism 380 in accordance with a measured value obtained by the temperature sensor (not illustrated) and the like. In addition, the control unit 390 operates the heat-source-side fan 360 and the utilization-side fan 350.

During heating operation, the control unit 390 operates the compressor 310 and controls the flow-path switching mechanism 370 to cause the refrigerant to circulate in the refrigerant circuit 320 in the order of the compressor 310, the utilization-side heat exchanger 330, the expansion mechanism 380, the heat-source-side heat exchanger 340, and the compressor 310. The control unit 390 also controls, as appropriate, the number of revolutions of the compressor 310 and the opening degree of the expansion mechanism 380 in accordance with a measured value obtained by the temperature sensor (not illustrated) and the like. In addition, the control unit 390 operates the heat-source-side fan 360 and the utilization-side fan 350.

During air-blowing operation, the control unit 390 operates only the utilization-side fan 350 while leaving the compressor 310 stopping (without causing the refrigerant to circulate in the refrigerant circuit 320).

Description of details of the operation of the air conditioning apparatus 300 is omitted here since the principle of operation of the air conditioning apparatus 300 is commonly known.

(2-2-2) Storage Battery

The partition 1 preferably includes the storage battery 10. In the present embodiment, the storage battery 10 is installed in the casing 110 of the first structure 100.

The storage battery 10 supplies electric power to the air conditioning apparatus 300 as an example of the air-environment adjusting portion. The storage battery 10 may supply electric power also to some or all of the controller 400, the human detection sensor 20, the fragrance releasing device 30, and the illumination device 40. Electric power may be supplied to the controller 400, the human detection sensor 20, the fragrance releasing device 30, and the illumination device 40 from a battery that differs from the storage battery 10. Due to the storage battery 10 included in the partition 1, various types of devices, such as the air conditioning apparatus 300 of the partition 1, can be utilized, even when no power socket is present near a place where the partition 1 is intended to be placed.

The storage battery 10 is preferably charged by setting the first structure 100 on the charger 12 during non-use (refer to FIG. 8). For example, the partition 1 with the partitioning portion 200 in the first state is set on the charger 12, thereby charging the storage battery 10 in a contactless manner. The charging method is, however, not limited to contactless charging, and charging to the storage battery 10 may be performed by inserting a power cable (not illustrated) into the power socket.

The partition 1 may not include the storage battery 10 and may be an apparatus that is utilized by connecting a power cable to a power socket.

(2-2-3) Human Detection Sensor

The partition 1 preferably includes the human detection sensor 20. The human detection sensor 20 is a sensor that detects presence/absence, the number, and the like of humans in a space (a space including the space Sa and the adjacent space Sn) in which the partition 1 is placed. The human detection sensor 20 is also a sensor that is used when the arousal level of a human in the space Sa is to be grasped by the later-described controller 400.

The human detection sensor 20 utilizes, for example, at least one of an infrared sensor, a Doppler sensor, and a camera for the purpose of detecting present/absence and the like of humans. The type of the human detection sensor 20 is, however, not limited to the types presented as examples and can be selected as appropriate.

The later-described controller 400 is capable of grasping the arousal level of a human in the space Sa by utilizing the body temperature of the human in the space Sa detected by the infrared sensor, the heart rate of the human in the space Sa detected by the Doppler sensor, or an image imaged by the camera.

In another form, instead of including the human detection sensor 20 in the partition 1, the partition 1 may be configured such that a detection result from an external sensor similar to the human detection sensor 20 is received by the partition 1 (the controller 400).

(2-2-4) Fragrance Releasing Device

The partition 1 preferably includes the fragrance releasing device 30. The fragrance releasing device 30 is an example of a releasing portion that releases an aromatic substance. The fragrance releasing device 30 releases an aromatic substance stored in an aromatic substance storage portion (not illustrated) to, for example, an air flow generated by the utilization-side fan 350. Such a configuration enables the fragrance releasing device 30 to deliver a fragrance to a position away from the fragrance releasing device 30. The fragrance releasing device 30 is, however, not limited thereto and may release a fragrance in a position not related to the air flow generated by the utilization-side fan 350.

The fragrance releasing device 30 is preferably capable of releasing a plurality of types of fragrances. In addition, the fragrance releasing device 30 is preferably capable of adjusting the release amount of an aromatic substance. The fragrance releasing device 30 is operated in response to operation of the operation portion (not illustrated) provided at the partition 1 or in response to an instruction of the later-described controller 400 and releases a fragrance of a type and an amount in accordance with the operation or the instruction.

(2-2-5) Illumination Device

The partition 1 preferably includes the illumination device 40. The illumination device 40 preferably has a color control function and a light control function.

The illumination device 40 is operated in response to an operation of the operation portion (not illustrated) provided at the partition 1 or in response to an instruction of the later-described controller 400 and emits light of a color/brightness in accordance with the operation or the instruction.

(2-2-6) Controller

The controller 400 is an apparatus that controls devices, such as the air conditioning apparatus 300, the fragrance releasing device 30, and the illumination device 40. The controller 400 is electrically connected to the control unit 390 of the air conditioning apparatus 300, the fragrance releasing device 30, and the illumination device 40 (refer to the broken lines in FIG. 4A to FIG. 4C). The controller 400 is also electrically connected to the human detection sensor 20 (refer to the broken lines in FIG. 4A to FIG. 4C). The controller 400 is configured to be connectable via a communication channel NW, such as the internet, to an external device 500, such as a mobile phone (smartphone), a tablet computer, a wearable device, and a laptop computer. Here, the external device 500 is a device that stores information relating to a user who uses the partition 1, in other words, a human in the space Sa. The external device 500 is, for example, a device carried by a user who uses the partition 1. The external device 500 may be, for example, a server or the like in which information relating to a user who uses the partition 1 is stored.

The controller 400 is realized by a computer. The controller 400 includes the control calculation device, the storage device, the input device, the output device, and the like. For the control calculation device, a processor, such as a CPU, is usable. The control calculation device reads a program stored in the storage device and performs a predetermined calculation process in accordance with the program. In addition, the control calculation device can write a calculation result in the storage device and read information stored in the storage device in accordance with a program. Part of the function of the controller 400 may be executed by a computer or the like connected to the controller 400 so as to be able to communicate therewith.

The controller 400 includes, as functional units, a device control unit 410, an arousal-level grasping unit 412, and a communication unit 430. The device control unit 410 and the arousal-level grasping unit 412 will be described later. The communication unit 430 is a functional unit for communication between the controller 400 and the external device 500. When a user or the like (a human in the space Sa, a human that plans to use the space Sa, a human that prepares the partition 1 for a human in the space Sa or a human that plans to use the space Sa, and the like) of the partition 1 performs a predetermined operation with respect to the external device 500, the external device 500 that stores information relating to humans (hereinafter, referred to as human information) transmits human information, and the controller 400 receives the human information via the communication unit 430. The storage device of the controller 400 has a human-information storage area 420 in which human information is to be stored. In the human-information storage area 420, the human information transmitted from the external device 500 is stored.

In the present embodiment, the human information is transmitted from the external device 500 but is not limited thereto. For example, human information may be input from an input portion (not illustrated) provided at the partition 1, and the human information may be stored in the human-information storage area 420.

The device control unit 410 is a unit that controls the air conditioning apparatus 300 as an example of the air-environment adjusting portion, the fragrance releasing device 30 that is provided at the partition 1 and releases an aromatic substance, and the illumination device 40 provided at the partition 1. The air conditioning apparatus 300, the fragrance releasing device 30, and the illumination device 40 can be operated by a user or the like from the operation portion (not illustrated) provided at the partition 1. In addition to this, the device control unit 410 controls the air conditioning apparatus 300, the fragrance releasing device 30, and the illumination device 40 as described below. Regarding device control in accordance with the arousal level of a human and device control in accordance with personal information, which are described below, execution/non-execution thereof may be selectable.

(Device Control in Accordance with Arousal Level of Human)

The controller 400 includes, as described above, the arousal-level grasping unit 412. The arousal-level grasping unit 412 grasps the arousal level (the awake level of a human) of a human in the space Sa on the basis of a result (for example, a heart rate, a body temperature, and an image (more specifically, blinks and expressions of a human in the image)) of the detection of a human in the space Sa by the human detection sensor 20. The smaller the arousal level, the lower the awake level (the stronger the sleepiness), and the larger the arousal level, the higher the awake level (the weaker the sleepiness). The arousal-level grasping unit 412 grasps the arousal level of a human on the basis of a result of detection by the human detection sensor 20 by using an algorithm (program) that is stored in the storage device of the controller 400 and that outputs an arousal level with respect to an input of a heart rate, a body temperature, the number of blinks recognized from an image of the human, and the like. The arousal-level grasping unit 412 may grasp the arousal level of a human on the basis of a result of the detection by the human detection sensor 20 by using a model that has learned through machine learning so as to output an arousal level with respect to an input of a heart rate, a body temperature, an image of the human, and like.

When the arousal-level grasping unit 412 determines that the arousal level of a human is decreased to be lower than a predetermined level, the device control unit 410 controls at least one of the air conditioning apparatus 300, the fragrance releasing device 30, and the illumination device 40.

For example, when the arousal-level grasping unit 412 determines that the arousal level of a human is decreased to be lower than a predetermined level, the device control unit 410 controls such that a set temperature of the air conditioning apparatus 300 is decreased. In other words, when the arousal-level grasping unit 412 determines that the arousal level of a human is decreased to be lower than a predetermined level, the device control unit 410 controls such that cooling by the air conditioning apparatus 300 is increased or heating by the air conditioning apparatus 300 is decreased. When the arousal-level grasping unit 412 determines that the arousal level of a human is decreased to be lower than a predetermined level, the device control unit 410 may control the air conditioning apparatus 300 such that the air conditioning apparatus 300 that has been stopping or that has been performing heating operation starts cooling operation. When the airflow generator 600 of the air conditioning apparatus 300 can automatically adjust the airflow direction, the device control unit 410 may control the air conditioning apparatus 300 on the basis of a result of the detection by the human detection sensor 20 to blow cool air toward a human whose arousal level is decreased.

When the arousal-level grasping unit 412 determines that the arousal level of a human is decreased to be lower than a predetermined level, the device control unit 410 may control, for example, the fragrance releasing device 30, as an alternative to controlling the air conditioning apparatus 300 or in addition to controlling the air conditioning apparatus 300, to release an aromatic substance of a type that encourages the arousal of the human. When the arousal-level grasping unit 412 determines that the arousal level of a human is decreased to be lower than a predetermined level, the device control unit 410 may control the fragrance releasing device 30, as an alternative to controlling the air conditioning apparatus 300 or in addition to controlling the air conditioning apparatus 300, to increase the releasing amount of an aromatic substance to be released.

When arousal-level grasping unit 412 determines that the arousal level of a human is decreased to be lower than a predetermined level, the device control unit 410 may control, for example, the illumination device 40, as an alternative to controlling the air conditioning apparatus 300 and/or the fragrance releasing device 30 or in addition to controlling the air conditioning apparatus 300 and/or the fragrance releasing device 30, to turn on the illumination device 40 that has been turned off and to change color and brightness to encourage the arousal of the human.

(Device Control in Accordance with Personal Information)

The device control unit 410 preferably controls the air conditioning apparatus 300 on the basis of the human information stored in the human-information storage area 420 of the storage device of the controller 400. The device control unit 410 may control, as an alternative to the air conditioning apparatus 300 or in addition to the air conditioning apparatus 300, at least one of the fragrance releasing device 30 and the illumination device 40 on the basis of the human information stored in the human-information storage area 420 of the storage device of the controller 400.

The human information stored in the human-information storage area 420 is information of a human (in other words, a user of the partition 1) in the space Sa, the information including at least one of information on schedules, information on diatheses, and information on preferences regarding air conditioning, fragrance, and illumination. Here, a human in the space Sa includes not only a human actually present in the space Sa but also a human that plans to use the space Sa. Information on schedules is, for example, information on the number of humans that intends to use the space Sa, the time of use, and the like. Information on diatheses is, for example, information of having cold sensitive, dry skin, and the like, and information on preferences regarding air conditioning, fragrance, and illumination is, for example, information on preferable set temperatures of cooling and heating, preferable fragrances, preferable illumination colors and brightness, and the like.

The device control unit 410 performs, for example, following control of the air conditioning apparatus 300, the fragrance releasing device 30, and the illumination device 40 on the basis of, for example, the human information stored in the human-information storage area 420. For example, the device control unit 410 starts operation of the air conditioning apparatus 300 and the fragrance releasing device 30, for example, earlier than a use planned time of the space Sa by a predetermined period of time (for example, before 10 minutes) on the basis of the information on schedules. The device control unit 410 may adjust the intensity of cooling and heating of the air conditioning apparatus 300 on the basis of the information on schedules in accordance with, for example, the number of humans who use the space Sa. In addition, for example, the device control unit 410 may control the air conditioning apparatus 300, the fragrance releasing device 30, and the illumination device 40 on the basis of, in addition to the information on schedules, the aforementioned arousal level of a human such that the arousal level of the human is increased at a predetermined time (for example, at a start time of a meeting). For example, the device control unit 410 may adjust the intensity of cooling and heating of the air conditioning apparatus 300 when, for example, the number of humans who use the space Sa is large. In addition, for example, the device control unit 410 controls the air conditioning apparatus 300, the fragrance releasing device 30, and the illumination device 40 on the basis of the information on diatheses, the information on preferences regarding air conditioning, fragrance, and illumination under conditions in accordance with the information.

In another form, as an alternative to the human information, an instruction generated on the basis of the human information may be transmitted from the external device 500 to the controller 400. An instruction generated on the basis of the human information is not the schedule information itself but is an instruction that is generated on the basis of the schedule information by the external device 500 and that is, for example, an instruction that specifies a time to start operation of the air conditioning apparatus 300 or an instruction regarding the intensity and the like of cooling of the air conditioning apparatus 300. In addition, for example, an instruction generated on the basis of the human information is not the diathesis information itself but is an instruction that is generated on the basis of the diathesis information by the external device 500 and that specifies a content of the operation of the air conditioning apparatus 300.

(3) Features (3-1)

The partition 1 of the aforementioned embodiment includes the first structure 100, the partitioning portion 200, and the air conditioning apparatus 300. The partitioning portion 200 is an example of the deformable partitioning portion. The air conditioning apparatus 300 is an example of the air-environment adjusting portion. The partitioning portion 200 is connected to the first structure 100. The partitioning portion 200 has the first end portion 210 on the side connected to the first structure 100, and the second end portion 220 on a distal side from the first end portion 210. The partitioning portion 200 deforms to partition the space Sa with respect to the adjacent space Sn. The air conditioning apparatus 300 is disposed at at least one of the first structure 100 and the partitioning portion 200. In the present embodiment, the air conditioning apparatus 300 is disposed at the first structure 100. The air conditioning apparatus 300 includes the utilization-side heat exchanger 330 and the airflow generator 600. The utilization-side heat exchanger 330 is an example of the cooling portion that cools air and the heating portion that heats air. The airflow generator 600 includes the utilization-side fan 350.

It is possible here to easily create a space partitioned from surroundings by the partition 1 and comfortable for a user.

(3-2)

In the partition 1 of the aforementioned embodiment, the partitioning portion 200 is deformable into the first state and the second state. The partitioning portion 200 in the first state is wound around the outer periphery of the first structure 100. The second state is a state in which the maximum value of the area of the partitioning portion 200 when viewed from every direction in the horizontal direction is larger than that in the first state.

It is possible here as a result of the partitioning portion 200 taking the second state during use to partition the space Sa that is comparatively large, with respect to the adjacent space Sn by the partition 1. Meanwhile, as a result of the partitioning portion 200 taking the first state during non-use, the partition 1 can be stored in a small space, for example. The partitioning portion 200 that can become compact by taking the first state facilitates displacement of the partition 1.

(3-3)

In the partition 1 of the aforementioned embodiment, the partitioning portion 200 is capable of taking a plurality of the second states in different forms.

It is possible here to partition a space into a plurality of different shapes in accordance with needs, which is convenient.

(3-4)

In the partition 1 of the aforementioned embodiment, the partitioning portion 200 has the first surface 200a and the second surface 200b opposite to the first surface 200a. One of the first surface 200a and the second surface 200b faces the space Sa, and the other of the first surface 200a and the second surface 200b faces the adjacent space Sn. The partitioning portion 200 is capable of taking, as the second state, the first form protruding on the side of the first surface 200a and the second form protruding on the side of the second surface 200b.

It is possible here to partition a space into different shapes in accordance with needs, which is convenient.

(3-5)

In the partition 1 of the aforementioned embodiment, the airflow generator 600 of the air conditioning apparatus 300 generates different airflows in accordance with which one of the first form and the second form is taken as the second state by the partitioning portion 200.

For example, it is preferable that the airflow generator 600 blow out air along the second surface 200b of the partitioning portion 200 in the first form when the partitioning portion 200 takes the first form (refer to the solid line in FIG. 6). In addition, it is preferable that the airflow generator 600 blow out air along the first surface 200a of the partitioning portion 200 in the second form when the partitioning portion 200 takes the second form (refer to the two-dot chain line in FIG. 6).

Different airflows are generated here in accordance with a direction in which the partitioning portion 200 protrudes. In other words, it is possible to adjust the airflow direction by changing the shape of the partitioning portion 200 of the partition 1. It is thus possible to accurately adjust the air environment of a space partitioned by the partition.

(3-6)

In the partition 1 of the aforementioned embodiment, the airflow generator 600 of the air conditioning apparatus 300 causes air to be blown out through the blow-out port 352 disposed at the first structure 100. The blow-out port 352 causes air to be blown out along at least a portion of the surface of the partitioning portion 200 in the second state.

It is possible here to accurately adjust the air environment of a space partitioned by the partition 1 since the partitioning portion 200 is also used as a guide for an airflow.

The blow-out port 352 is preferably disposed in the vicinity of the first end portion 210 of the partitioning portion 200.

(3-7)

In the partition 1 of the aforementioned embodiment, the air conditioning apparatus 300 includes the utilization-side heat exchanger 330 that functions as the cooling portion that cools air by the heat pump provided in the first structure 100 and a heating portion that heats air by the heat pump provided in the first structure 100.

Waste heat that is generated when air is cooled by the heat pump and when air is heated by the heat pump is discharged into, for example, the first space S1 (for example, an underfloor space, an attic, or a ventilation duct) in which an influence of the waste heat onto the temperature of the space Sa is small. In other words, air that has exchanged heat with the heat-source-side heat exchanger 340 is discharged into the first space S1.

The waste heat that is generated when air is cooled by the heat pump and when air is heated by the heat pump may be discharged into a space (second space S2) that is determined that no human is present therein on the basis of a result of the detection by the human detection sensor 20 included in the partition 1. In other words, air that has exchanged heat with the heat-source-side heat exchanger 340 may be discharged into a space (the second space S2) that is determined that no human is present therein on the basis of a result of the detection by the human detection sensor 20 included in the partition 1.

The waste heat that is generated when air is cooled by the heat pump and when air is heated by the heat pump may be stored in the heat storage material 342 provided in the first structure 100.

It is possible here, while suppressing the influence of waste heat with respect humans, to dispose the partition 1 at a comparatively free position, cool/heat air by using the heat pump, and easily create a temperature-controlled comfortable space.

(3-8)

The partition 1 of the aforementioned embodiment includes the storage battery 10 that supplies electric power at least to the air conditioning apparatus 300. The partition 1 is of a portable type.

It is possible here to create, even in a place where a power source is difficult to be ensured, a comfortable space in which air environment is adjusted by the partition 1, which is highly flexible in terms of space utilization.

(3-9)

In the partition 1 of the aforementioned embodiment, the first structure 100 has a columnar shape extending to have the axial direction in the up-down direction. The first structure 100 includes the leg portions 120 that assists self-standing of the first structure 100.

It is possible here to suppress by the leg portions 120 the first structure 100 from falling, which is highly safe.

(3-10)

The partition 1 of the aforementioned embodiment includes the arousal-level grasping unit 412 and the device control unit 410. The arousal-level grasping unit 412 grasps the arousal level of a human in the space Sa. The device control unit 410 controls at least one of the air conditioning apparatus 300, the fragrance releasing device 30 that is provided at the partition 1 and releases an aromatic substance, and the illumination device 40 provided at the partition 1, in accordance with the arousal level of a human grasped by the arousal-level grasping unit 412.

It is possible here to change at least one of the air environment, fragrance, and illumination of the space Sa formed by the partition 1, in accordance with the arousal level of the human and thus possible to improve the arousal level of the human in the space Sa and improve work efficiency and the like.

(3-11)

The partition 1 of the aforementioned embodiment includes the communication unit 430 and the device control unit 410. The communication unit 430 communicates with the external device 500 that stores information (human information) relating to a human in the space Sa. The device control unit 410 controls the air conditioning apparatus 300 on the basis of human information received from the external device 500 via the communication unit 430 or an instruction that is generated by the external device 500 on the basis of human information and that is received via the communication unit 430.

It is easy here to adjust the air environment of the space Sa to an air environment preferable for a user on the basis of the information on a human in the space Sa.

The partitioning portion 200 is preferably deformable. However, the control of the air conditioning apparatus 300, the fragrance releasing device 30, and the illumination device 40 by the controller 400 is also applicable to a partition in which the partitioning portion is not deformable.

(3-12)

In the partition 1 of the aforementioned embodiment, the airflow generator 600 of the air conditioning apparatus 300 includes the filter 351a that removes dust in air. The filter 351a is provided at the suction port 351 formed at the casing 110.

It is possible here to improve cleanliness of air blown out from the partition 1.

(4) Modifications

Modifications of the aforementioned embodiment are presented below. Modifications may be combined together, as appropriate, in a range without mutual contradiction.

(4-1) Modification 1A

The partitioning portion 200 of the aforementioned embodiment is wound around the outer periphery of the first structure 100 in the first state (non-use state). The partitioning portion 200, however, may not be configured to be wound around the outer periphery of the first structure 100 in the first state.

Figure 11:
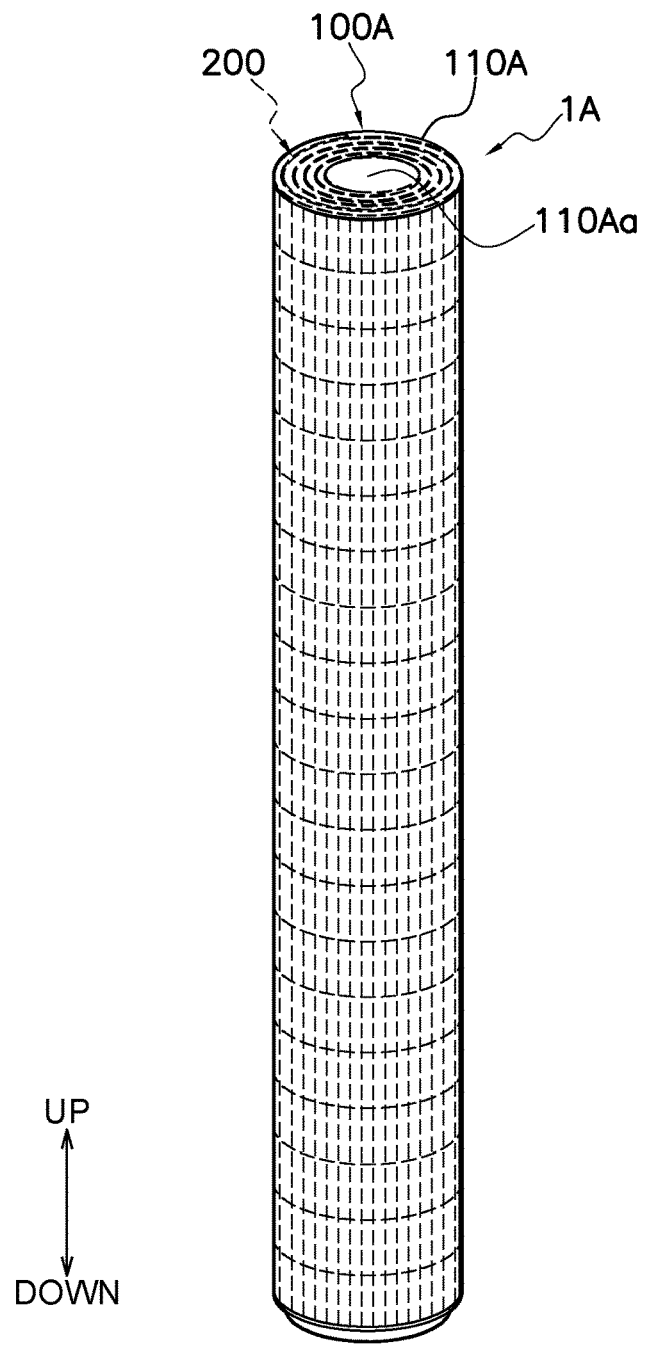
FIG. 11 is a schematic perspective view of a partition of a modification 1A in which the deformable partitioning portion is in the first state.

For example, as with a partition 1A in FIG. 11, the partitioning portion 200 may be accommodated in an inner portion of a casing 110A of a first structure 100A in the first state. The partitioning portion 200 is configured to be extractable through an opening (not illustrated) provided at the outer wall of the casing 110A and extending in the up-down direction. The first structure 100A preferably includes, for accommodation of the partitioning portion 200 into the inner portion of the casing 110A, a winding mechanism (not illustrated) that utilizes a spring or a motor to wind the partitioning portion 200.

For example, in the partition 1A, the first end portion 210 of the partitioning portion 200 is connected, not to the outer wall of the casing 110A, to a core 110Aa disposed in the inner portion of the casing 110A (refer to FIG. 11). To cause the partitioning portion 200 in the second state to take the first state, the core 110Aa is rotated by the winding mechanism, the partitioning portion 200 in the second state is thereby wound around the core 110Aa in the inner portion of the casing 110A and accommodated in the inner portion of the casing 110A.

In the partition 1A, since the partitioning portion 200 is accommodated in the inner portion of the first structure 100A, it is not possible to define the maximum value of the area of the partitioning portion 200 in the first state when viewed in the horizontal direction from every direction. Thus, when the partitioning portion 200 is accommodated in the inner portion of the first structure 100A, the maximum area of the first structure 100A when viewed in the horizontal direction from every direction is regarded as the maximum value of the area of the partitioning portion 200 in the first state when viewed in the horizontal direction from every direction. Also in the partition 1A, the maximum value of the area of the partitioning portion 200 in the second state is larger than the maximum value of the area of the partitioning portion 200 in the first state when viewed in the horizontal direction from every direction.

(4-2) Modification 1B

The partitioning portion 200 of the partition 1 of the aforementioned embodiment has a roll shape that can be wound around the casing 110. The shape of the partitioning portion 200 is, however, not limited to the roll shape.

Figure 12:
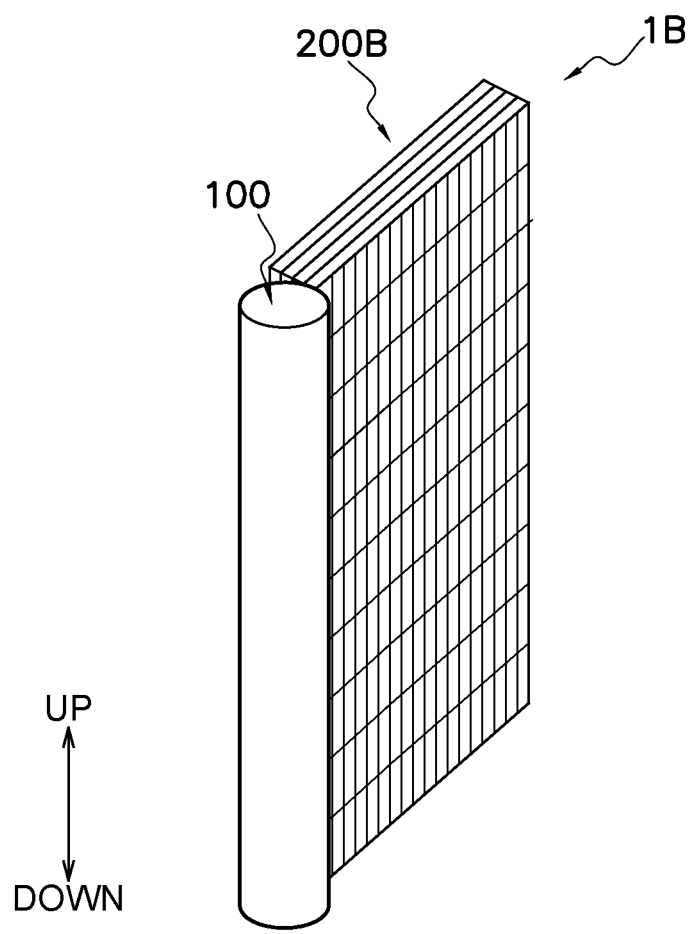
FIG. 12 is a schematic perspective view of a partition of a modification 1B in which the deformable partitioning portion is in the first state.
Figure 13:
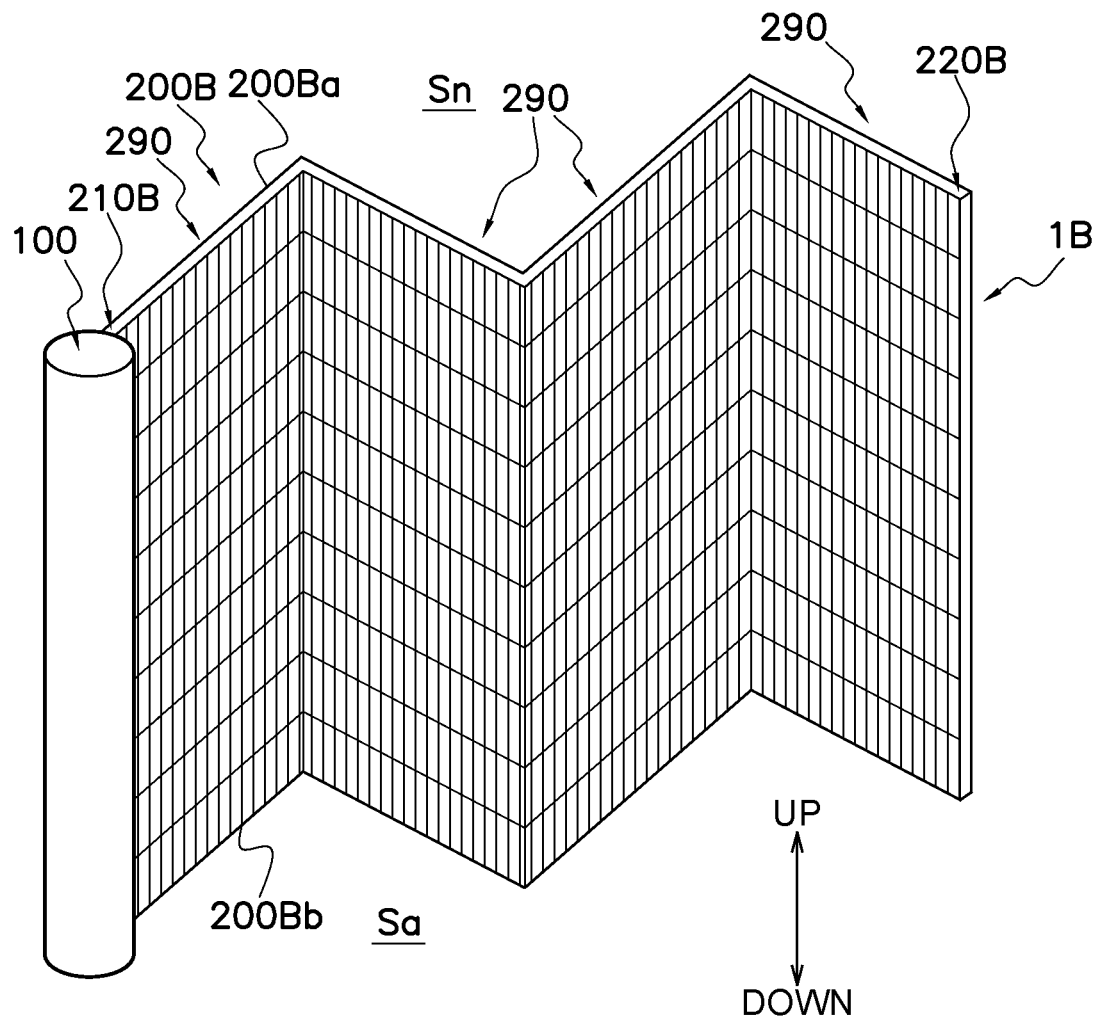
FIG. 13 is a schematic perspective view of the partition in FIG. 12 in which the deformable partitioning portion is in the second state.

For example, as in FIG. 12 and FIG. 13, the shape of a partitioning portion 200B of a partition 1B may be a concertina shape (folding screen shape) in which a plurality of plates 290 are connected to each other by hinges (not illustrated). The number of the illustrated plates 290 is merely an example and may be less than or more than the illustrated number. The partitioning portion 200B is an integral member but is not limited thereto.

Also in the partition 1B, the partitioning portion 200B is connected to the first structure 100. The partitioning portion 200B has a first end portion 210B on the side connected to the first structure 100, and a second end portion 220B on a distal side from the first end portion 210B. The partitioning portion 200B deforms to partition the space Sa with respect to the adjacent space Sn.

The partitioning portion 200B is deformable into the first state (non-use state; refer to FIG. 12) and the second state (use state; refer to FIG. 13). In the first state, the partitioning portion 200B is folded in the vicinity of the first structure 100. The second state is a state in which the maximum value of the area of the partitioning portion 200B when viewed in the horizontal direction from every direction is larger than that in the first state.

The partitioning portion 200B is capable of taking a plurality of the second states in different forms. For example, the partitioning portion 200B is capable of taking, as the second state, the first form in which a plate 290 located nearest to the first end portion 210B and a plate 290 adjacent to the plate 290 protrude on the side of a first surface 200Ba and the second form in which the plate 290 located nearest to the first end portion 210B and the plate 290 adjacent to the plate 290 protrude on the side of a second surface 200Bb. Also in the partition 1B, the airflow generator 600 of the air conditioning apparatus 300 preferably generates different airflows in accordance with which one of the first form and the second form is taken as the second state by the partitioning portion 200B. For example, when the partitioning portion 200B takes the first form, the airflow generator 600 blows out air through the blow-out port 352 along the second surface 200Bb of the plate 290 located nearest to the first end portion 210B in the partitioning portion 200B. For example, when the partitioning portion 200B takes the second form, the airflow generator 600 blows out air through the blow-out port 352 along the first surface 200Ba of the plate 290 located nearest to the first end portion 210B in the partitioning portion 200B.

(4-3) Modification 1C

In the aforementioned embodiment, the airflow generator 600 of the air conditioning apparatus 300 blows out air through the blow-out port 352 formed at the first structure 100 or a nozzle provided at the first structure 100 but is not limited thereto.

Figure 14A:
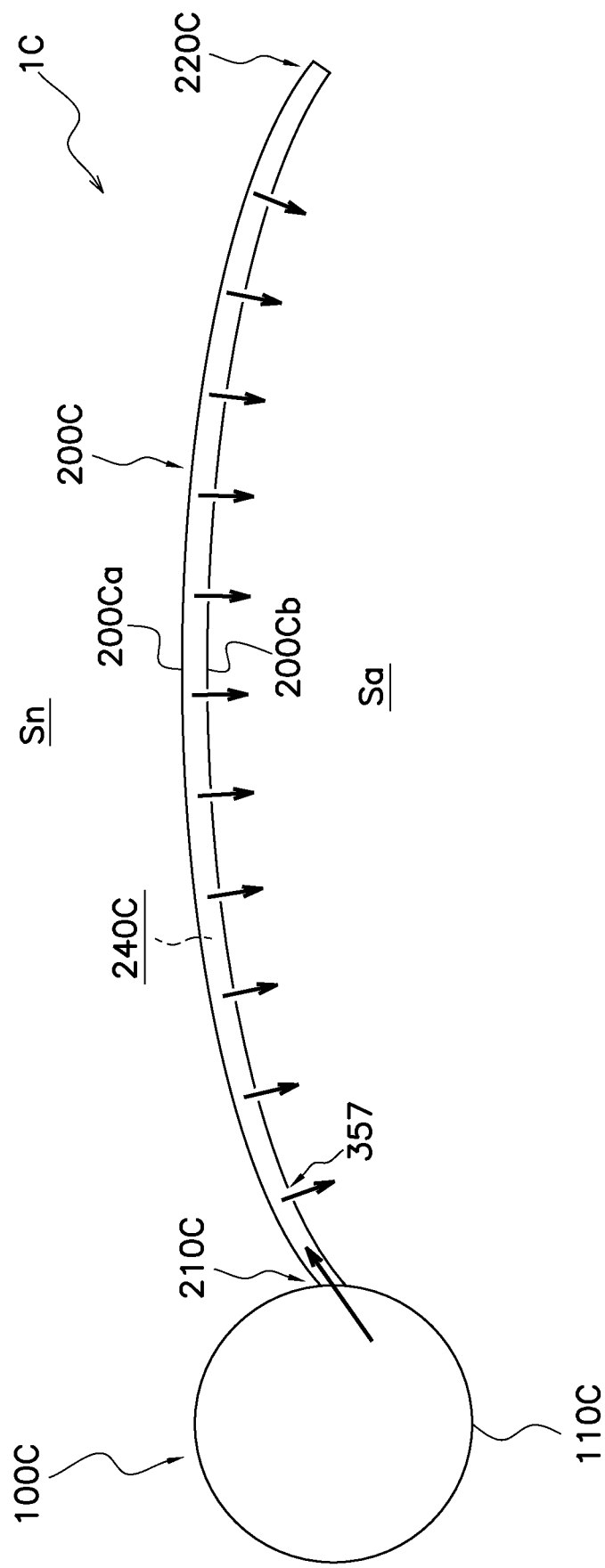
FIG. 14A is a schematic top plan view of a partition of a modification 1C.

For example, as in FIG. 14A, an air flow path 240C extending from a first end portion 210C to a second end portion 220C may be formed at a partitioning portion 200C of the partition 1C. In other words, the air conditioning apparatus 300 as an example of the air environment adjusting portion of the partition 1C causes a first fluid to flow in the inner portion of the partitioning portion 200C. The first fluid here is air. In particular, when the air flow path 240C is thus formed in the inner portion of the partitioning portion 200C, the partitioning portion 200C is preferably an integral member from the point of view of simplification and the like of the structure.

The air flow path 240C is formed by using, for example, a tube extending in a direction from the first end portion 210C toward the second end portion 220C and on which a plurality of blow-out ports 357 are formed along the direction from the first end portion 210C toward the second end portion 220C. The tube is disposed to penetrate, from the first end side toward the second end side of the partitioning portion, the longitudinal frames 250 in the partitioning portion 200 of the first embodiment or the plates 290 in the partitioning portion 200B of the modification 1C. A plurality of the air flow paths 240C, in other words, a plurality of the tubes that form the flow path 240C may be disposed in the up-down direction. When the partitioning portion 200C has a roll shape such as that presented as an example in the first embodiment, the tube is preferably manufactured with a flexible material although the material is not limited. When the partitioning portion 200C has a concertina shape such as that presented as an example in the modification 1B, the tube may be manufactured with a comparatively rigid material. The air flow path 240C is in communication with an air flow path (not illustrated) disposed in the casing 110C and in which the air that has been taken in through the suction port 351 and passed through the utilization-side heat exchanger 330 of the air conditioning apparatus 300 flows. The air that is supplied from the air flow path in the casing 110C to the air flow path 240C is blown out through the blow-out ports 357. That is, in the partition 1C, the airflow generator 600 causes air to be blown out through the blow-out ports 357 disposed at the partitioning portion 200C. Since air is blown out from the partitioning portion 200C, it is easy here, compared with when the blow-out port is provided at the first structure 100C, to cause air to be blown out to reach a position away from the first structure 100C.

Figure 14B:
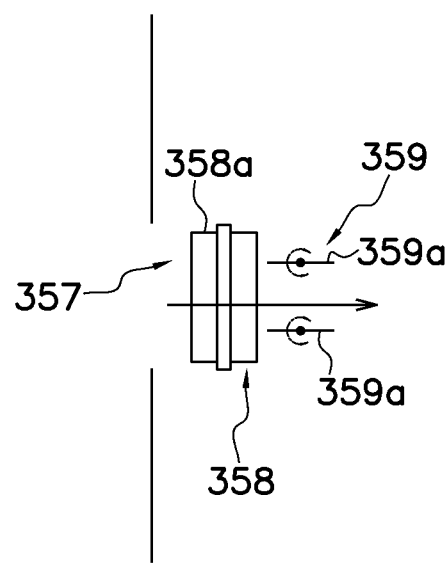
FIG. 14B is a schematic enlarged view around a blow-out port formed at a partitioning portion of the partition in FIG. 14A.

The airflow generator 600 preferably includes at least one of a horizontal-direction airflow direction adjustment mechanism 358 that is disposed at the blow-out ports 357 and an up-down-direction airflow direction adjustment mechanism 359 that is disposed at the blow-out ports 357. The horizontal-direction airflow direction adjustment mechanism 358 adjusts the airflow direction in the horizontal direction, and the up-down-direction airflow direction adjustment mechanism 359 adjusts the airflow direction in the up-down direction (refer to FIG. 14B). The horizontal-direction airflow direction adjustment mechanism 358 and the up-down-direction airflow direction adjustment mechanism 359 are disposed, for example, on the downstream side from the blow-out ports 357 but may be disposed on the upstream side from the blow-out ports 357. The horizontal-direction airflow direction adjustment mechanism 358 includes, for example, a flap 358a rotatable around an axis extending in the up-down direction. The up-down-direction airflow direction adjustment mechanism 359 includes, for example, a flap 359a rotatable around an axis extending in the horizontal direction. Each of the airflow direction adjustment mechanisms 358 and 359 may be a mechanism that is manually operated or may be a mechanism that is automatically operated in accordance with an operation by a human with respect to an operation portion provided at the partition 1C or a result of detection by the human detection sensor 20.

Preferably, in the partition 1C, the partitioning portion 200C is capable of taking, as the second state, the first form protruding on the side of a first surface 200Ca and the second form protruding on the side of a second surface 200Cb, and the partition 1C generates different airflows in accordance with which one of the first form and the second form is taken as the second state by the partitioning portion 200C.

For example, the partitioning portion 200C of the partition 1C is provided with the air flow path 240C in communication with the blow-out ports 357 provided on the side of the second surface 200Cb, and another air flow path (not illustrated) in communication with a blow-out port (not illustrated) provided on the side of the first surface 200Ca. In the partition 1C, the airflow generator 600 utilizes, for example, a flow-path switching damper such as that described in the first embodiment and supplies the air that has passed through the utilization-side heat exchanger 330 of the air conditioning apparatus 300 to different flow paths of the partitioning portion 200C in accordance with which one of the first form and the second form is taken as the second state by the partitioning portion 200C. When the partitioning portion 200C takes the first form, for example, the airflow generator 600 supplies the air that has passed through the utilization-side heat exchanger 330 to the flow path 240C and causes the air to be blown out through the blow-out ports 357 toward the second surface 200Cb (refer to FIG. 14A). When the partitioning portion 200C takes the second form, the air that has passed through the utilization-side heat exchanger 330 is supplied to a flow path in communication with a blow-out port (not illustrated) provided on the side of the first surface 200Ca, and the air is blown out through a blow-out port provided on the side of the first surface 200Ca toward the first surface 200Ca.

Description has been provided here using, as an example of a form in which the blow-out ports 357 is provided at the partitioning portion 200C of the partition 1C with the airflow direction adjustment mechanisms 358 and 359 disposed at the blow-out ports 357; however, the form is not limited thereto. For example, the partitioning portion 200C of the partition 1C may include a nozzle (a nozzle including an airflow direction adjustment mechanism) whose blowing-out direction is changeable. The form in which, as an alternative to the airflow direction adjustment mechanisms 358 and 359, a nozzle whose blowing-out direction is changeable is used has already been described in the aforementioned embodiment, and description thereof is thus omitted.

(4-4) Modification 1D

Figure 15:
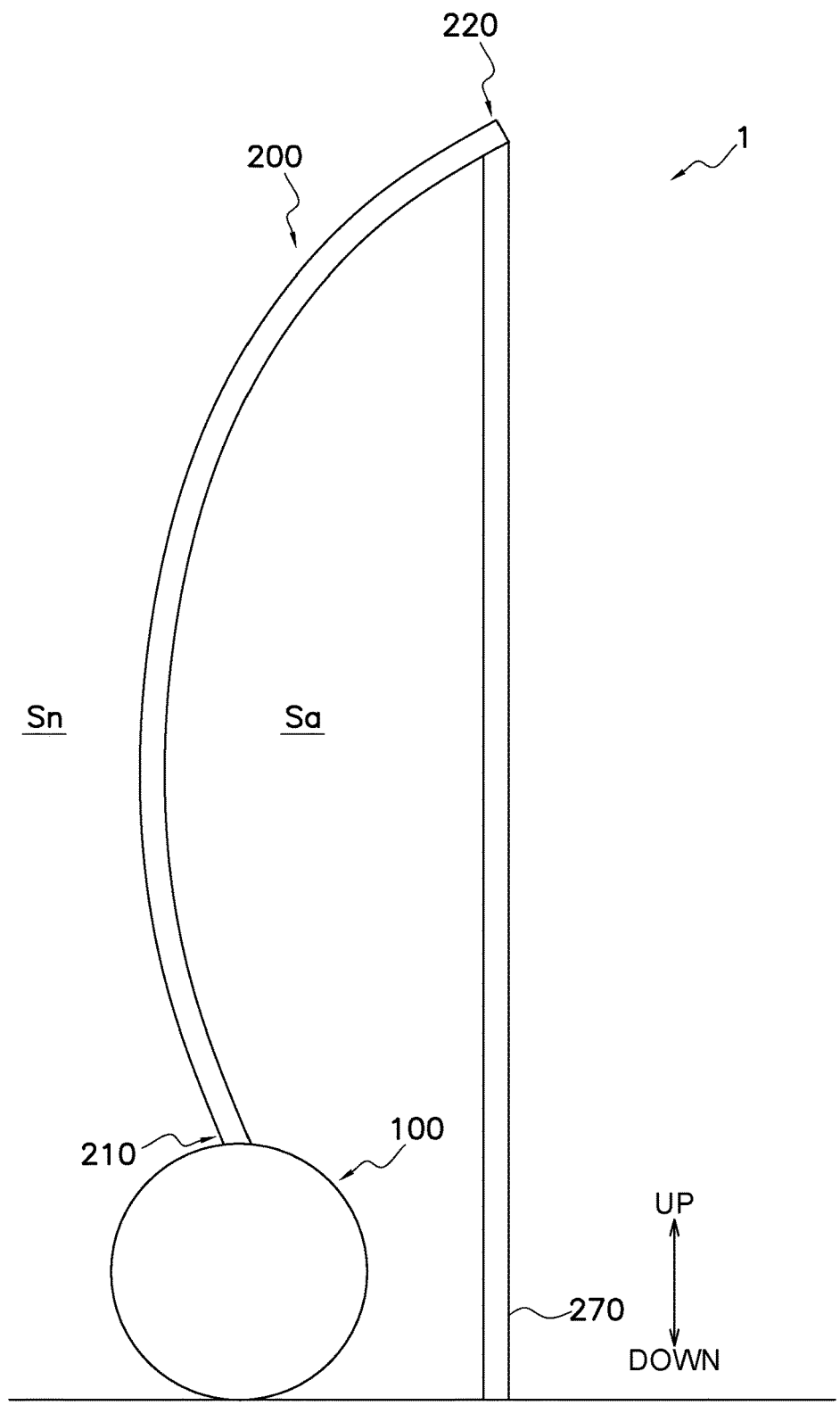
FIG. 15 is a schematic side view of a partition according to a modification 1D in which the deformable partitioning portion is in the second state when the first structure is horizontally installed.

The partition 1 is used in a state in which the first structure 100 stands in the up-down direction in the aforementioned embodiment but is not limited thereto. For example, the partition 1 may be utilized in a state in which, as illustrated in FIG. 15, the first structure 100 lies in the horizontal direction. When the first structure 100 is utilized in the state of lying in the horizontal direction, the side of the second end portion 220 of the partitioning portion 200 is preferably configured to be supported by a support 270.

The partition 1 may be configured to be also usable in each of a state in which the first structure 100 is directed in the up-down direction and a state in which the first structure 100 lies in the horizontal direction. That is, the first structure 100 of the partition 1 has a columnar shape extending to have the axial direction in the first direction. When the first structure 100 is installed such that the first direction is the up-down direction, in the second state, the first end portion 210 and the second end portion 220 of the partitioning portion 200 are disposed at positions at an identical height and away from each other in the horizontal direction (refer to FIG. 1 and FIG. 3). When the first structure 100 is installed such the first direction is the horizontal direction, in the second state, the first end portion 210 and the second end portion 220 of the partitioning portion 200 are disposed at different heights (refer to FIG. 15).

Flexibility of the shape of a space partitioned by the partition 1 is high here since the installation state of the first structure 100 can be changed.

(4-5) Modification 1E

The partition 1 includes the heat-pump air conditioning apparatus 300 in the aforementioned embodiment but is not limited thereto. As an alternative to the air conditioning apparatus 300, the partition 1 may include, as the air-environment adjusting portion, a fan that serves as the airflow generating portion (not including the heating portion and the cooling portion). The fan may be provided at an outer portion of the casing 110 or at the partitioning portion 200.

(4-6) Modification 1F

The stored form of the partitioning portion 200 of the partition 1 is not limited to the roll shape and the concertina type (foldable type), which are presented as examples, and may be in the form of a telescope type or the like.

Second Embodiment

A partition 1D of a second embodiment will be described. The partition 1D of the second embodiment has many features similar to those of the partition in the first embodiment, and thus, most of description of the features other than differences is omitted. Some or all of the features of the partitions described in the first embodiment and the modifications thereof are applicable, as appropriate, to the partition 1D within a range without contradiction.

Figure 18:
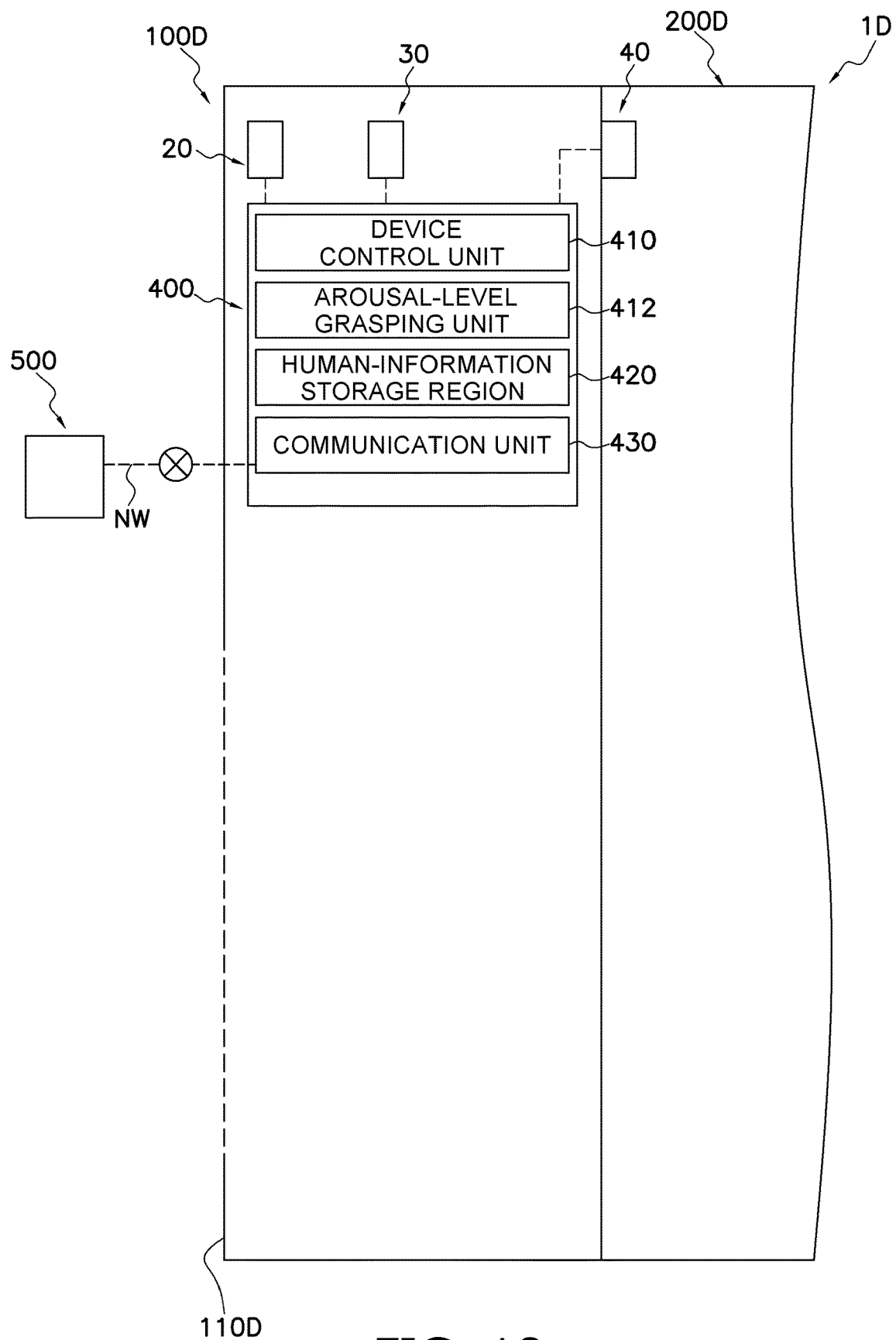
FIG. 18 is an example of the block diagram of the partition in FIG. 16.

In the first embodiment, the partition 1 includes the air conditioning apparatus 300. Meanwhile, the partition 1D in FIG. 16 does not include the air conditioning apparatus 300 (refer to FIG. 18).

Figure 16:
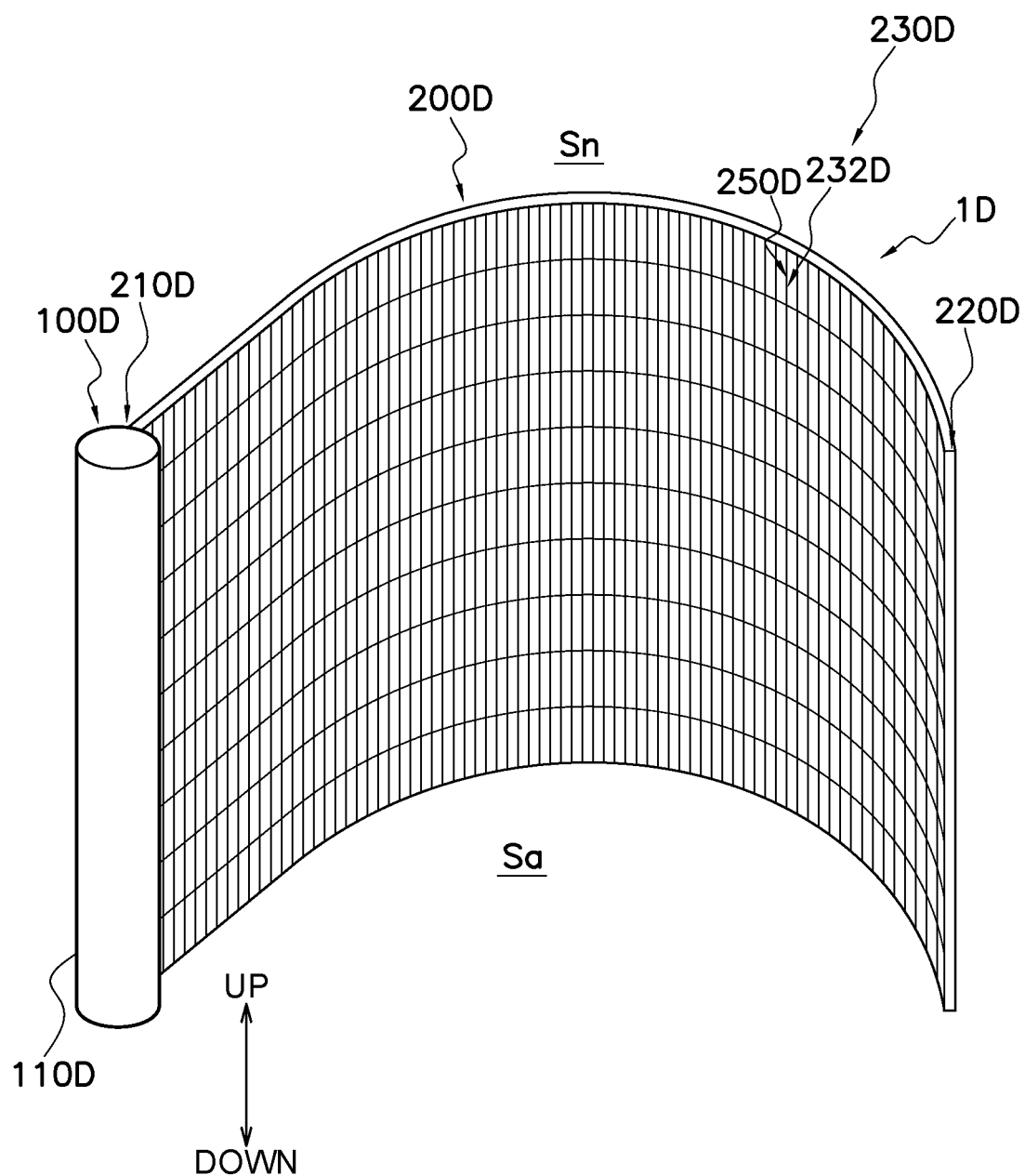
FIG. 16 is a schematic perspective view of a partition according to a second embodiment, the partition including the deformable partitioning portion in the second state.
Figure 17:
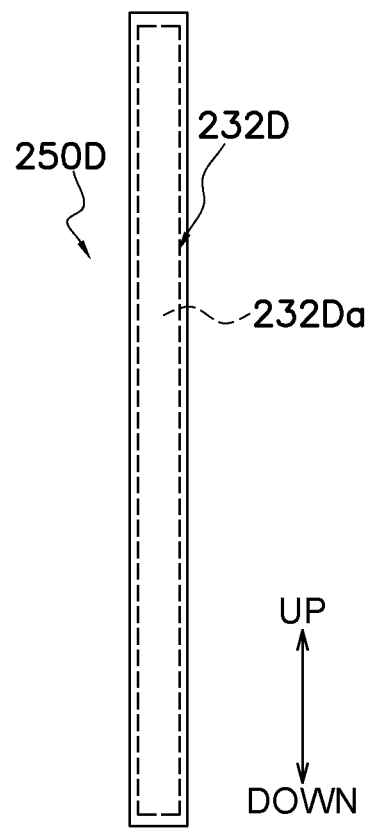
FIG. 17 describes disposition of a heat storage portion of the partition in FIG. 16.

The partition 1D includes a partitioning portion 200D that is connected to a first structure 100D, that has a first end portion 210D on the side connected to the first structure 100D and a second end portion 220D on a distal side from the first end portion 210D, and that deforms to partition the space Sa with respect to the adjacent space Sn (refer to FIG. 16). In the partition 1D, the partitioning portion 200D is provided with, as an alternative to the air conditioning apparatus 300 as the air-environment adjusting portion, a heat storage portion 232D as the cooling portion and/or the heating portion of an air-environment adjusting portion 230D. The heat storage portion 232D is provided, for example as illustrated in FIG. 17, in the inner portion of each of the longitudinal frames 250D, and a heat storage material 232Da is accommodated in the heat storage portion 232D. When the heat storage portion 232D is intended to be used as the cooling portion, the heat storage portion 232D is cooled during non-use in a cooling apparatus. When the heat storage portion 232D is intended to be used as the heating portion, the heat storage portion 232D is heated during non-use in a heating apparatus. When the heat storage portion 232D has functions of both the cooling portion and the heating portion, the heat storage portion 232D preferably accommodates the heat storage material 232Da suitable for the function as the cooling portion and another heat storage material 232Da suitable for the function as the heating portion. As a result of the partitioning portion 200D having a function as the heat storage portion 232D, it is possible to cool/heat air by the radiant heat of the heat storage material when the partition 1 is used.

With the partition 1D described above, it is possible to realize cooling and heating of air while simplifying the configuration/structure, compared with the partition 1 and the like.

In the partition 1D, the air-environment adjusting portion 230D does not use electric power and thus does not require the storage battery 10 for supplying electric power to the air-environment adjusting portion 230D. When such a configuration is employed, cooling/heating of air by the air-environment adjusting portion 230D is not controllable, and a function of controlling the air-environment adjusting portion 230D is thus not required for the controller 400.

Although, here, the partition 1D does not include the air conditioning apparatus 300, the partition 1D may include the air conditioning apparatus 300 as the air-environment adjusting portion or a fan as the airflow generating portion, in addition to the heat storage portion 232D as the cooling portion and/or the heating portion of the air-environment adjusting portion 230D. The fan is provided, for example, in an inner portion or at an outer portion of a casing 110D of the first structure 100D or at the partitioning portion 200D. The fan may generate an air flow along at least a portion of the surface of the partitioning portion 200D in the second state.

Third Embodiment

A partition 1E of a third embodiment will be described. The partition 1E of the third embodiment has many features similar to those of the partition in the first embodiment, and thus, most of description of the features other than differences is omitted. Some or all of the features of the partitions described in the first and second embodiments and the modifications thereof are applicable, as appropriate, to the partition 1E within a range without contradiction.

In the first embodiment, the partition 1 includes the air conditioning apparatus 300. Meanwhile, the partition 1E in FIG. 19 does not include the air conditioning apparatus 300 (refer to FIG. 20).

Figure 19:
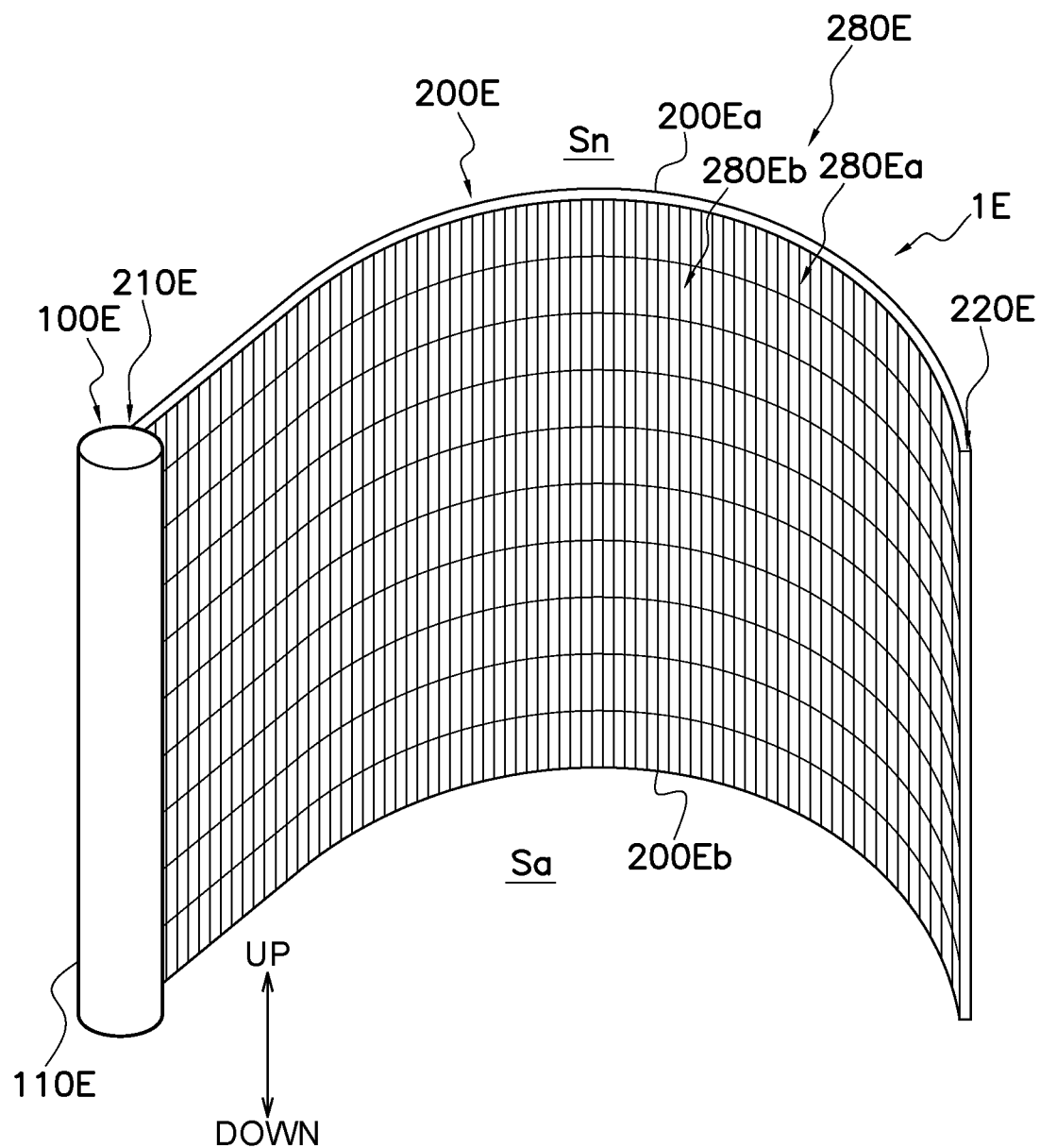
FIG. 19 is a schematic perspective view of a partition according to a third embodiment, the partition including the deformable partitioning portion in the second state.
Figure 20:
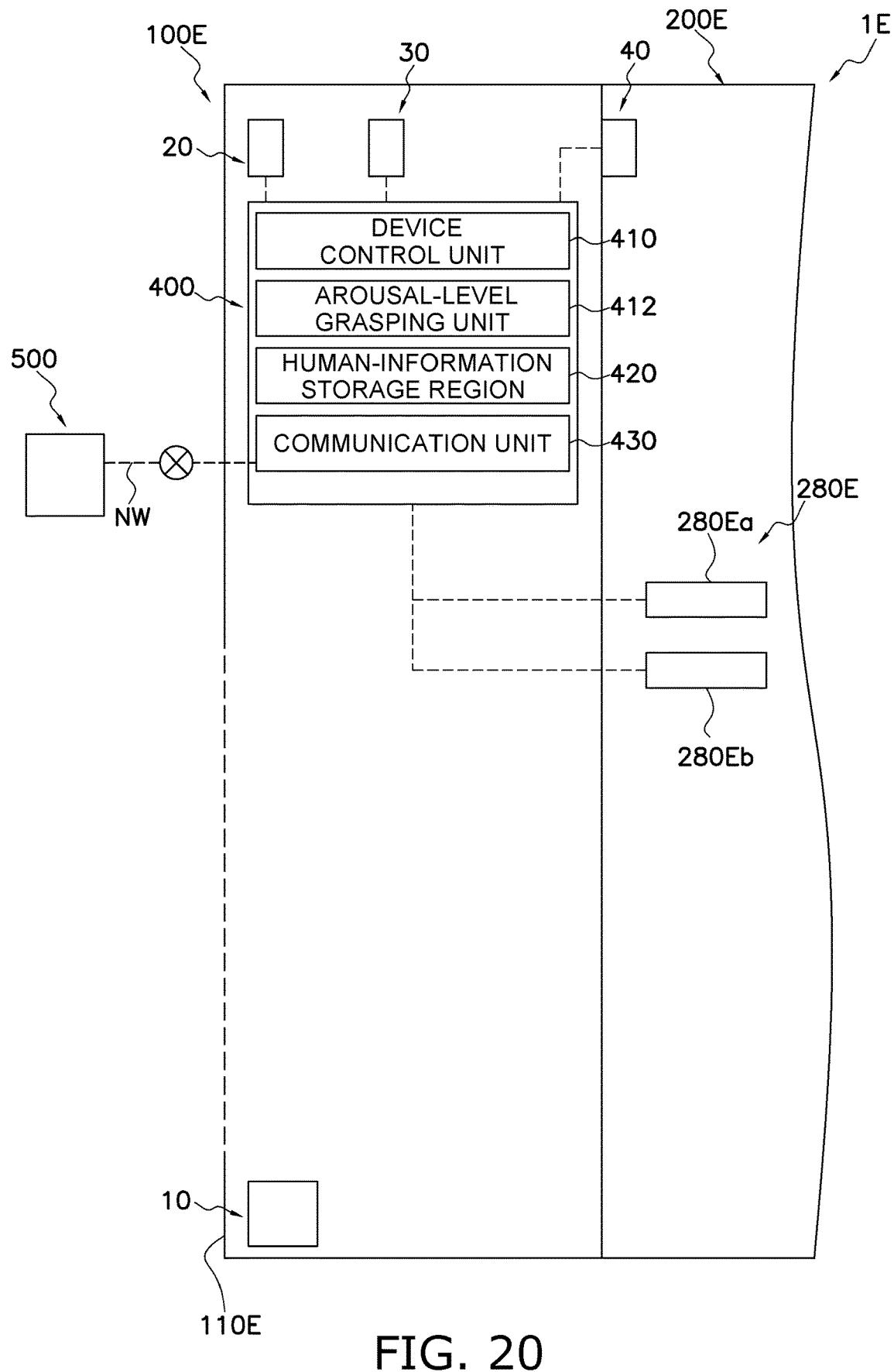
FIG. 20 is an example of the block diagram of the partition in FIG. 19.

The partition 1E includes a partitioning portion 200E that is connected to a first structure 100E, that has a first end portion 210E on the side connected to the first structure 100E and a second end portion 220E on a distal side from the first end portion 210E, and that deforms to partition the space Sa with respect to the adjacent space Sn (refer to FIG. 19). The partition 1E is provided with, as an alternative to the air conditioning apparatus 300 as the air-environment adjusting portion, an air-environment adjusting portion 280E at the partitioning portion 200E. The air-environment adjusting portion 280E includes a Peltier element as a cooling portion 280Ea and an electric heater as a heating portion 280Eb of the air-environment adjusting portion (refer to FIG. 20). Such a configuration enables heating and cooling of air by the radiant heat of the cooling portion 280Ea and the heating portion 280Eb during use.

Electric power is preferably supplied to the Peltier element as the cooling portion 280Ea and the electric heater as the heating portion 280Eb from, for example, the storage battery 10 accommodated in the casing 110E.

The cooling portion 280Ea and the heating portion 280Eb are preferably provided at a first surface 200Ea of the partitioning portion 200E and a second surface 200Eb of the partitioning portion 200E, respectively. In the partition 1E, for example, the device control unit 410 of the controller 400 that controls operation of the air-environment adjusting portion 280E is preferably configured to activate the cooling portion 280Ea or the heating portion 280Eb on the side of the second surface 200Eb when the partitioning portion 200E takes the first form protruding on the side of the first surface 200Ea, and activate the cooling portion 280Ea or the heating portion 280Eb on the side of the first surface 200Ea when the partitioning portion 200E takes the second form protruding on the side of the second surface 200Eb.

The partition 1E may be further provided with a fan as an airflow generating portion. The fan is provided, for example, in an inner portion or at an outer portion of the casing 110E of the first structure 100E or at the partitioning portion 200E. The fan may generate an air flow along at least a portion of the surface of the partitioning portion 200E in the second state.

Fourth Embodiment

Figure 21:
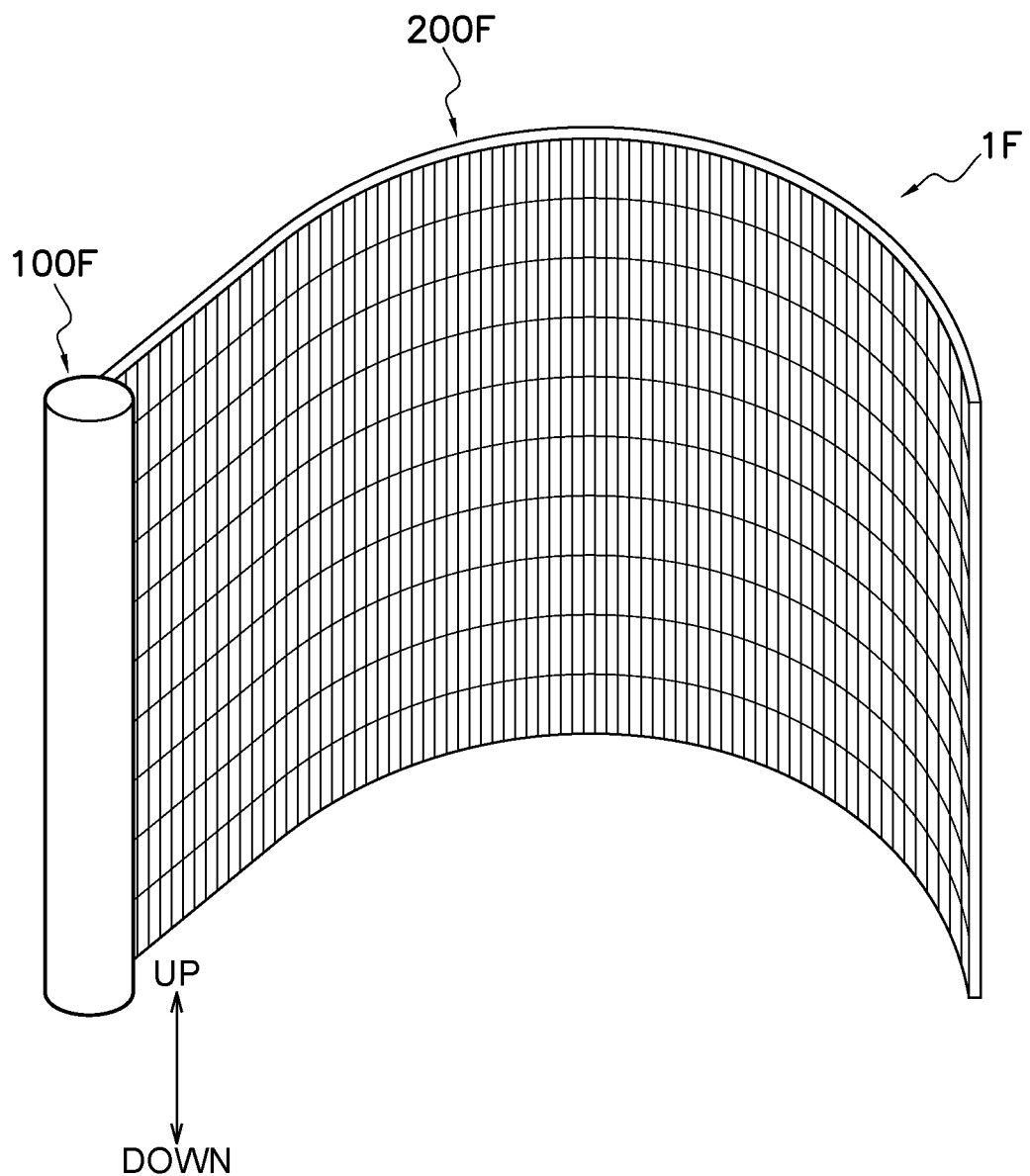
FIG. 21 is a schematic perspective view of a partition according to a fourth embodiment, the partition including the deformable partitioning portion in the second state.
Figure 22:
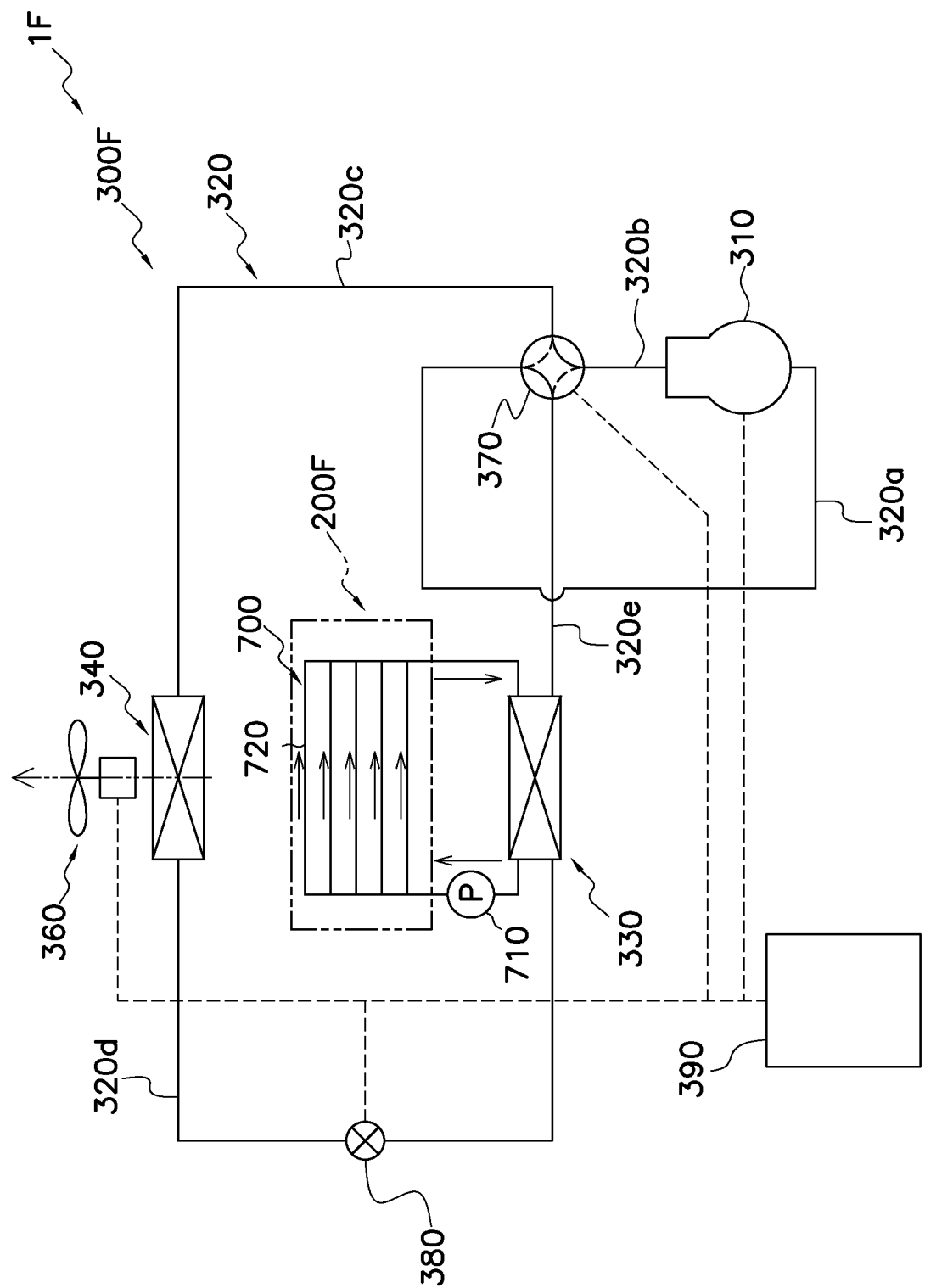
FIG. 22 is a schematic diagram of an air conditioning apparatus of the partition according to the fourth embodiment.

With reference to FIG. 21 and FIG. 22, a partition 1F of a fourth embodiment will be described. FIG. 21 is a schematic perspective view of the partition 1F. FIG. 22 is a schematic diagram of the air conditioning apparatus 300F included in the partition 1F.

The partition 1F of the fourth embodiment has many features similar to those of the partition in the first embodiment, and thus, description of the features other than differences is basically omitted to avoid duplication of description. Some or all of the features of the partitions described in the first embodiment to the third embodiment and the modifications thereof are applicable, as appropriate, to the partition 1F within a range without contradiction.

As illustrated in FIG. 21 and FIG. 22, the partition 1F includes a partitioning portion 200F, a first structure 100F, and the air conditioning apparatus 300F. The partitioning portion 200F, the first structure 100F, and the air conditioning apparatus 300F differ from the partitioning portion 200, the first structure 100, and the air conditioning apparatus 300 of the partition 1 in the first embodiment in terms of, mainly the following points.

The air conditioning apparatus 300F does not include the utilization-side fan 350. The air conditioning apparatus 300F includes a first fluid circuit 700 connected to the utilization-side heat exchanger 330. The utilization-side heat exchanger 330 of the air conditioning apparatus 300F is, for example, a plate-type heat exchanger; however, the type thereof is not limited. In the utilization-side heat exchanger 330 of the air conditioning apparatus 300F, the refrigerant that flows in the refrigerant circuit 320 exchanges heat with the first fluid flowing in the first fluid circuit 700, not with air. The first fluid is, for example, water or oil as a heat medium but is not limited thereto. The first fluid circuit 700 includes a pipe 720 provided in an inner portion of the partitioning portion 200F. In FIG. 22, a form in which a plurality of the pipes 720 are disposed in parallel in the inner portion of the partitioning portion 200F is drawn; however, the disposition of the pipes 720 in the inner portion of the partitioning portion 200F can be determined, as appropriate. The first fluid circuit 700 is provided with a pump 710. The pump 710 is disposed, for example, in an inner portion of the first structure 100F. Driving the pump 710 causes the first fluid to circulate in the first fluid circuit 700, and the first fluid that has exchanged heat with the refrigerant in the utilization-side heat exchanger 330 flows in the inner portion of the partitioning portion 200F.

With such a structure of the partition 1F, it is possible to cool and heat air around the partitioning portion 200F by a convective flow generated by a temperature difference between a room temperature and the first fluid cooled or heated in the utilization-side heat exchanger 330 and by the radiation of the first fluid cooled or heated in the utilization-side heat exchanger 330.

Although description has been provided here by presenting, as an example, a case in which the first fluid is cooled or heated by utilizing the vapor compression refrigeration cycle apparatus, the vapor compression refrigeration cycle apparatus may not be used for the first fluid. For example, the partition 1F may include, like an oil heater, a circulation flow path for the first fluid in an inner portion of the partitioning portion 200F and heat the first fluid by an electric heater provided in an inner portion of the first structure 100F or at the partitioning portion 200F to thereby cause the first fluid to circulate in the circulation flow path. Such a configuration enables heating of air around the partitioning portion 200F.

The first structure 100F of the partition 1F may be further provided with an airflow generating portion that causes air to be blown out through a blow-out port (not illustrated) disposed at the first structure 100F. The blow-out port preferably causes air to be blown out along at least a portion of the surface of the partitioning portion 200F in the second state. The airflow generating portion may be provided at the partitioning portion 200F. The partition 1F may blow out air from the airflow generating portion along at least a portion of the surface of the partitioning portion 200F in the second state while causing the first fluid to circulate in the first fluid circuit 700 and causing the first fluid to flow in the inner portion of the first structure 100F. Such a configuration easily promotes cooling and heating of air by the first fluid.

Embodiments of the present disclosure have been described above; however, it should be understood that various changes in forms and details are possible without deviating from the gist and the scope of the present disclosure described in the claims.

The present disclosure is useful as a partition that partitions a space and provides a space comfortable for a user.

What is claimed is:
1. A partition comprising:
a first structure;
a deformable partitioning portion connected to the first structure, the deformable partitioning portion having a first end portion on a side connected to the first structure and a second end portion on a distal side from the first end portion,
the deformable partitioning portion being configured to partition a predetermined space with respect to an adjacent space,
the deformable partitioning portion being configured to deform into
a first state of being accommodated in an inner portion of the first structure, of being wound around an outer periphery of the first structure, or of being folded in a vicinity of the first structure, and a second state in which a maximum value of an area of the deformable partitioning portion when viewed from every direction in a horizontal direction is larger than in the first state, the deformable partitioning portion being configured to take a plurality of different forms of the second state, the deformable partitioning portion having a first surface and a second surface opposite to the first surface, and the deformable partitioning portion being configured to take, as the second state, a first form of protruding on a side of the first surface and a second form of protruding on a side of the second surface; and an air-environment adjusting portion disposed at at least one of the first structure and the deformable partitioning portion, the air-environment adjusting portion including at least one of a cooling portion configured to cool air, a heating portion configured to heat air, and an airflow generating portion configured to generate an airflow.

2. The partition according to claim 1, wherein
the air-environment adjusting portion includes at least the airflow generating portion, and
the airflow generating portion is configured to generate different airflows in accordance with which one of the first form and the second form is taken as the second state by the deformable partitioning portion.

3. The partition according to claim 1, wherein
the air-environment adjusting portion includes at least the airflow generating portion, and the airflow generating portion is configured to cause air to be blown out through a blow-out port disposed at the first structure, and
the blow-out port is disposed in a vicinity of the first end portion of the deformable partitioning portion.

4. The partition according to claim 3 wherein
the blow-out port is configured to cause air to be blown out along at least a portion of a surface of the deformable partitioning portion in the second state.

5. The partition according to claim 1, wherein
the air-environment adjusting portion includes at least the airflow generating portion, and the airflow generating portion is configured to cause air to be blown out through a blow-out port disposed at the deformable partitioning portion.

6. The partition according to claim 5, wherein
the airflow generating portion further includes an airflow direction adjustment mechanism configured to adjust an airflow direction.

7. The partition according to claim 1, wherein
the first structure has a columnar shape extending to have an axial direction in a first direction,
when the first structure is installed such that the first direction is an up-down direction, the first end portion and the second end portion of the deformable partitioning portion are disposed at positions at an identical height and away from each other in a horizontal direction in the second state, and
when the first structure is installed such that the first direction is the horizontal direction, the first end portion and the second end portion of the deformable partitioning portion are disposed at different heights in the second state.

8. The partition according to claim 1, wherein
the air-environment adjusting portion is configured to cause a first fluid to flow in an inner portion of the deformable partitioning portion.

9. The partition according to claim 8, wherein
the first fluid is air.

10. The partition according to claim 1, wherein
at least one of the cooling portion and the heating portion includes a heat storage material.

11. The partition according to claim 1, wherein
the air-environment adjusting portion includes at least one of
the cooling portion, the cooling portion being configured to cool air by a heat pump provided in the first structure and
the heating portion, the heating portion being configured to heat air by the heat pump provided in the first structure, and
waste heat generated when air is cooled by the heat pump and when air is heated by the heat pump is
discharged into a first space in which an influence of the waste heat onto a temperature of the predetermined space is small or into a second space in which it is determined that no human is present therein based on a result of detection by a human detection sensor included in the partition or
stored in a heat storage material provided in the first structure.

12. The partition according to claim 1, further comprising:
a storage battery configured to supply electric power to the air-environment adjusting portion,
the partition being portable.

13. The partition according to claim 1, wherein
the first structure has a columnar shape extending to have an axial direction in an up-down direction, and
the first structure includes a leg portion configured to assist self-standing of the first structure.

14. The partition according to claim 1, further comprising:
an arousal-level grasping unit configured to grasp an arousal level of a human in the predetermined space; and
a control unit configured to control, in accordance with the arousal level of the human grasped by the arousal-level grasping unit, at least one of
the air-environment adjusting portion,
a releasing portion provided at the partition and configured to release an aromatic substance, and
an illumination device provided at the partition.

15. The partition according to claim 1, further comprising:
a communication unit configured to communicate with an external device that stores information relating to a human in the predetermined space; and
a control unit configured to control the air-environment adjusting portion based on
information that relates to a human in the predetermined space and that is received from the external device via the communication unit or
an instruction that is generated by the external device based on information relating to a human in the predetermined space and that is received via the communication unit.

16. The partition according to claim 1, wherein
the airflow generating portion includes a filter configured to remove dust in air.

* * * * *